United States Patent
Soriaga et al.

(10) Patent No.: US 10,594,521 B2
(45) Date of Patent: Mar. 17, 2020

(54) ASYNCHRONOUS MULTICARRIER COMMUNICATIONS

(71) Applicant: QUALCOMM Incorporated, San Diego, CA (US)

(72) Inventors: Joseph Binamira Soriaga, San Diego, CA (US); Tingfang Ji, San Diego, CA (US); John Edward Smee, San Diego, CA (US); Naga Bhushan, San Diego, CA (US); Peter Gaal, San Diego, CA (US); Krishna Kiran Mukkavilli, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/011,234

(22) Filed: Jun. 18, 2018

(65) Prior Publication Data

US 2018/0302251 A1    Oct. 18, 2018

Related U.S. Application Data

(62) Division of application No. 14/574,149, filed on Dec. 17, 2014, now Pat. No. 10,003,480.

(Continued)

(51) Int. Cl.
*H04L 25/03* (2006.01)
*H04J 11/00* (2006.01)
(Continued)

(52) U.S. Cl.
CPC .... *H04L 25/03821* (2013.01); *H04J 11/0036* (2013.01); *H04L 25/03159* (2013.01);
(Continued)

(58) Field of Classification Search
CPC ........... H04L 25/03821; H04L 27/2601; H04L 25/03834; H04L 27/2646; H04L 25/03159; H04L 5/0007; H04W 28/20; H04J 11/0036
See application file for complete search history.

(56) References Cited

U.S. PATENT DOCUMENTS 7,113,549 B1    9/2006   Isaksson et al.
7,848,298 B2   12/2010   Attar et al.
(Continued)

FOREIGN PATENT DOCUMENTS

CN    101305529 A    11/2008
CN    102158332 A     8/2011
(Continued)

OTHER PUBLICATIONS

5GNOW: Non-Orthogonal Asynchronous Waveforms for Future Mobile Application by Wunder et al. (Year: 2014).*
(Continued)

*Primary Examiner* — Dady Chery
(74) *Attorney, Agent, or Firm* — Liem T. Do

(57) ABSTRACT

Apparatuses and methods for performing asynchronous multicarrier communications are provided. One such method involves generating, at a first wireless device, a waveform including one or more carriers, shaping the waveform to reduce interference between the waveform and adjacent waveforms, and transmitting, on a spectrum, the shaped waveform asynchronously.

24 Claims, 27 Drawing Sheets

Related U.S. Application Data

(60) Provisional application No. 62/004,337, filed on May 29, 2014.

(51) Int. Cl.
*H04L 27/26* (2006.01)
*H04W 28/20* (2009.01)
*H04L 5/00* (2006.01)

(52) U.S. Cl.
CPC .... *H04L 25/03834* (2013.01); *H04L 27/2601* (2013.01); *H04L 27/2646* (2013.01); *H04W 28/20* (2013.01); *H04L 5/0007* (2013.01)

(56) References Cited

U.S. PATENT DOCUMENTS

| | | | |
|---|---|---|---|
| 8,355,461 B2* | 1/2013 | Schmid | H04L 25/03828 327/291 |
| 8,478,198 B2 | 7/2013 | Gupta | |
| 8,634,354 B2 | 1/2014 | Rashid et al. | |
| 8,750,835 B2 | 6/2014 | Deshpande | |
| 10,003,480 B2 | 6/2018 | Soriaga et al. | |
| 2003/0203721 A1 | 10/2003 | Berezdivin et al. | |
| 2006/0203721 A1 | 9/2006 | Hsieh et al. | |
| 2006/0203779 A1* | 9/2006 | Attar | H04W 28/18 370/335 |
| 2008/0080627 A1 | 4/2008 | Korhonen et al. | |
| 2013/0102254 A1 | 4/2013 | Cyzs et al. | |
| 2013/0185617 A1 | 7/2013 | Roh et al. | |
| 2013/0195082 A1 | 8/2013 | Wu et al. | |
| 2014/0106740 A1 | 4/2014 | Zhou et al. | |
| 2014/0119420 A1 | 5/2014 | Hewavithana et al. | |
| 2014/0126455 A1 | 5/2014 | Li et al. | |

FOREIGN PATENT DOCUMENTS

| | | |
|---|---|---|
| CN | 103248377 A | 8/2013 |
| EP | 2037605 A1 | 3/2009 |
| JP | 2009535981 A | 10/2009 |
| JP | 2010232857 A | 10/2010 |
| RU | 2194368 C2 | 12/2002 |
| WO | 2004064295 A2 | 7/2004 |
| WO | 2006096765 A1 | 9/2006 |
| WO | 2008001457 A1 | 1/2008 |
| WO | 2009028589 A1 | 3/2009 |
| WO | 2009059109 A2 | 5/2009 |
| WO | 2009123647 A1 | 10/2009 |
| WO | 2009158546 A1 | 12/2009 |
| WO | 2013016585 A1 | 1/2013 |
| WO | 2014065894 A1 | 5/2014 |

OTHER PUBLICATIONS

Taiwan Search Report—TW104115638—TIPO—dated Jan. 18, 2019.

Guvenc I., "Statistics of Macrocell-Synchronous Femtocell-Asynchronous Users-Delays for improved Femtocell Uplink receiver Design", IEEE Communications Letters, IEEE Service Center, Piscataway, NJ, US, Apr. 1, 2009 (Apr. 1, 2009), XP011293423, vol. 13, No. 4, pp. 239-241, ISSN: 1089-7798.

International Search Report and Written Opinion—PCT/US2015/030423—ISA/EPO—dated Jan. 25, 2016.

Medjahdi Y., et al., "Asynchronous OFDM/FBMC Interference Analysis in Selective Channels" Personal Indoor and Mobile Radio Communications (PIMRC), 2010 IEEE 21st International Symposium on, IEEE, Piscataway, NJ, USA, Sep. 26, 2010 (Sep. 26, 2010), XP031838158, pp. 538-542, ISBN: 978-14244-8017-3.

Wunder G., et al., "5GNOW: Non-Orthogonal, Asynchronous Waveforms for Future Mobile Applications", IEEE Communications Magazine, IEEE Service Center, Piscataway, US, vol. 52, No. 2, Feb. 12, 2014 (Feb. 12, 2014), pp. 97-105, XP011539680, ISSN: 0163-6804, DOI: 10.1109/MCOM.2014.6736749 [retrieved on Feb. 10, 2014] p. 99-p. 100; figure 2.

Yeh S.P., et al., "Capacity and Coverage Enhancement in Heterogeneous Networks", IEEE Wireless Communications, IEEE Service Center, Piscataway, NJ, US, Jun. 1, 2011 (Jun. 1, 2011), XP011367616, vol. 18, No. 3, pp. 32-38, ISSN: 1536-1284, DOI: 10.1109/MWC.2011.5876498.

Fettweis G., et al., "GFDM—Generalized Frequency Division Multiplexing", 2009 IEEE 69th Vehicular Technology Conference; Apr. 26-29, 2009, Barcelona, Spain, IEEE, Piscataway, NJ, USA, Apr. 26, 2009 (Apr. 26, 2009), pp. 1-4, XP031474518, ISBN: 978-1-4244-2517-4.

* cited by examiner

Transmitter

FIG. 9 - Transmitter

Receiver

FIG. 11 - Receiver

OFDMA with WOLA
(OFDMA Transmitter)

OFDMA with WOLA
(OFDMA Receiver)

Multicarrier FDE
(FDE Transmitter)

Multicarrier FDE
(FDE Receiver)

*Network Planning*

FIG. 25 - Network Planning

ASYNCHRONOUS MULTICARRIER COMMUNICATIONS

PRIORITY CLAIM

This application is a divisional of U.S. application Ser. No. 14/574,149, filed Dec. 17, 2014, which claims priority to and the benefit of U.S. Provisional Application No. 62/004,337, filed May 29, 2014, the entire contents of each of which are incorporated herein by reference as if fully set forth below and for all applicable purposes.

TECHNICAL FIELD

Aspects of the present disclosure relate generally to wireless communication systems, and more particularly, to asynchronous multicarrier communications.

BACKGROUND

Wireless communication networks are widely deployed to provide various communication services such as telephony, video, data, messaging, broadcasts, and so on. Such networks, which are usually multiple access networks, support communications for multiple users by sharing the available network resources.

As the demand for mobile broadband access continues to increase, research and development continue to advance wireless communication technologies not only to meet the growing demand for mobile broadband access, but to advance and enhance the user experience.

Synchronous communications are often used within the wireless communication networks. However, there are some disadvantages involved with the use of such synchronous communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or elements of all aspects of the disclosure nor to delineate the scope of any or all aspects of the disclosure. Its sole purpose is to present some concepts of one or more aspects of the disclosure in a simplified form as a prelude to the more detailed description that is presented later.

One or more aspects of the present disclosure provide for enabling asynchronous multicarrier communications. For example, in one aspect at a communication link level, methods for waveform design to reduce intercarrier interference between links help enable the asynchronous multicarrier communications. One such waveform design method of wireless communication involves generating, at a first wireless device, a waveform including one or more carriers, shaping the waveform to reduce interference between the waveform and adjacent waveforms, and transmitting, on a spectrum, the shaped waveform asynchronously.

Another aspect involves a wireless communication device including means for generating, at a first wireless device, a waveform including one or more carriers, means for shaping the waveform to reduce interference between the waveform and adjacent waveforms, and means for transmitting, on a spectrum, the shaped waveform asynchronously.

Another aspect involves a wireless communication device including at least one processor, a memory communicatively coupled to the at least one processor, and a communication interface communicatively coupled to the at least one processor, where the at least one processor is configured to generate, at a first wireless device, a waveform including one or more carriers, shape the waveform to reduce interference between the waveform and adjacent waveforms, and transmit, on a spectrum, the shaped waveform asynchronously.

Another aspect involves a non-transitory computer readable medium storing computer executable code, including code for generating, at a first wireless device, a waveform including one or more carriers, shaping the waveform to reduce interference between the waveform and adjacent waveforms, and transmitting, on a spectrum, the shaped waveform asynchronously.

Another aspect involves a method of wireless communication including receiving, at a first wireless device, a signal via asynchronous communications on a spectrum, filtering the received signal to reduce interference from other asynchronous communications on the spectrum, and recovering user data from the filtered signal.

Another aspect involves a wireless communication device including means for receiving, at a first wireless device, a signal via asynchronous communications on a spectrum, means for filtering the received signal to reduce interference from other asynchronous communications on the spectrum, and means for recovering user data from the filtered signal.

Another aspect involves a wireless communication device including at least one processor, a memory communicatively coupled to the at least one processor, and a communication interface communicatively coupled to the at least one processor, where the at least one processor is configured to receive, at a first wireless device, a signal via asynchronous communications on a spectrum, filter the received signal to reduce interference from other asynchronous communications on the spectrum, and recover user data from the filtered signal.

Another aspect involves a non-transitory computer readable medium storing computer executable code, including code for receiving, at a first wireless device, a signal via asynchronous communications on a spectrum, filtering the received signal to reduce interference from other asynchronous communications on the spectrum, and recovering user data from the filtered signal.

The waveform design for transmitting data can also involve structures and methods for performing orthogonal frequency division multiple access (OFDMA) modulation with weighted overlap and add (WOLA) filtering. In another aspect, the waveform design can involve structures and methods for performing multicarrier frequency domain equalization (FDE).

At the network planning level, an aspect of the present disclosure involves structures and methods for allowing the coexistence of both asynchronous and synchronous communications. Such structures and methods may involve provisioning between asynchronous and synchronous communications and provisioning bandwidth for handling collisions.

One such aspect involves a method of wireless communication including providing a preselected bandwidth for communications on a wireless network, provisioning a first portion of the preselected bandwidth for synchronous communications on the wireless network, and provisioning, based on a traffic demand in the wireless network, a second portion of the preselected bandwidth for asynchronous communications on the wireless network.

Another such aspect involves a wireless communication device, including means for providing a preselected bandwidth for communications on a wireless network, means for provisioning a first portion of the preselected bandwidth for synchronous communications on the wireless network, and means for provisioning, based on a traffic demand in the wireless network, a second portion of the preselected bandwidth for asynchronous communications on the wireless network.

Another aspect involves a wireless communication device including at least one processor, a memory communicatively coupled to the at least one processor, and a communication interface communicatively coupled to the at least one processor, where the at least one processor is configured to provide a preselected bandwidth for communications on a wireless network, provision a first portion of the preselected bandwidth for synchronous communications on the wireless network, and provision, based on a traffic demand in the wireless network, a second portion of the preselected bandwidth for asynchronous communications on the wireless network.

Another such aspect involves a non-transitory computer readable medium storing computer executable code, including code for providing a preselected bandwidth for communications on a wireless network, provisioning a first portion of the preselected bandwidth for synchronous communications on the wireless network, and provisioning, based on a traffic demand in the wireless network, a second portion of the preselected bandwidth for asynchronous communications on the wireless network.

These and other aspects of the method and apparatus will become more fully understood upon a review of the detailed description, which follows. Other aspects, features, and embodiments of the present method and apparatus will become apparent to those of ordinary skill in the art, upon reviewing the following description of specific, exemplary embodiments of the present method and apparatus in conjunction with the accompanying figures. While features of the present method and apparatus may be discussed relative to certain embodiments and figures below, all embodiments of the present method and apparatus can include one or more of the advantageous features discussed herein. In other words, while one or more embodiments may be discussed as having certain advantageous features, one or more of such features may also be used in accordance with the various embodiments of the method and apparatus discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

As to synchronous communication, it can be good for link efficiency but has associated costs. For example, at the receiver, synchronous communication can require the receiver to acquire, track, and correct timing before data can be received. At the transmitter, and after the receiver has had the timing configured, the transmitter may need additional timing advance and tight coordination across the entire operating bandwidth before data transfer can occur. As such, synchronous communication may not be ideal in certain applications, such as those applications that send data at relatively slow data rates.

Aspects of the present disclosure involve establishing asynchronous communication without as many requirements as synchronous communication. More specifically, methods for enabling asynchronous communications are presented that involve transmit and receive waveform design with waveform shaping that can sufficiently reduce interference between carriers to enable asynchronous communication. In some aspects, the transmit waveform design involves use of (1) orthogonal frequency division multiple access (OFDMA) modulation with weighted overlap and add (WOLA) filtering, (2) multicarrier frequency domain equalization (FDE), or (3) other schemes suitable for enabling asynchronous communication. In some aspects, the receive waveform design involves (1) orthogonal frequency division multiple access (OFDMA) modulation with weighted overlap and add (WOLA) filtering, (2) multicarrier frequency domain equalization (FDE), or (3) other schemes suitable for enabling asynchronous communication.

Aspects of the present disclosure also involve provisioning between asynchronous and synchronous communications and provisioning bandwidth for handling collisions. One such aspect involves providing a preselected bandwidth for communications on a wireless network, provisioning a first portion of the preselected bandwidth for synchronous communications on the wireless network, and provisioning, based on a traffic demand in the wireless network, a second portion of the preselected bandwidth for asynchronous communications on the wireless network.

Figure 1:
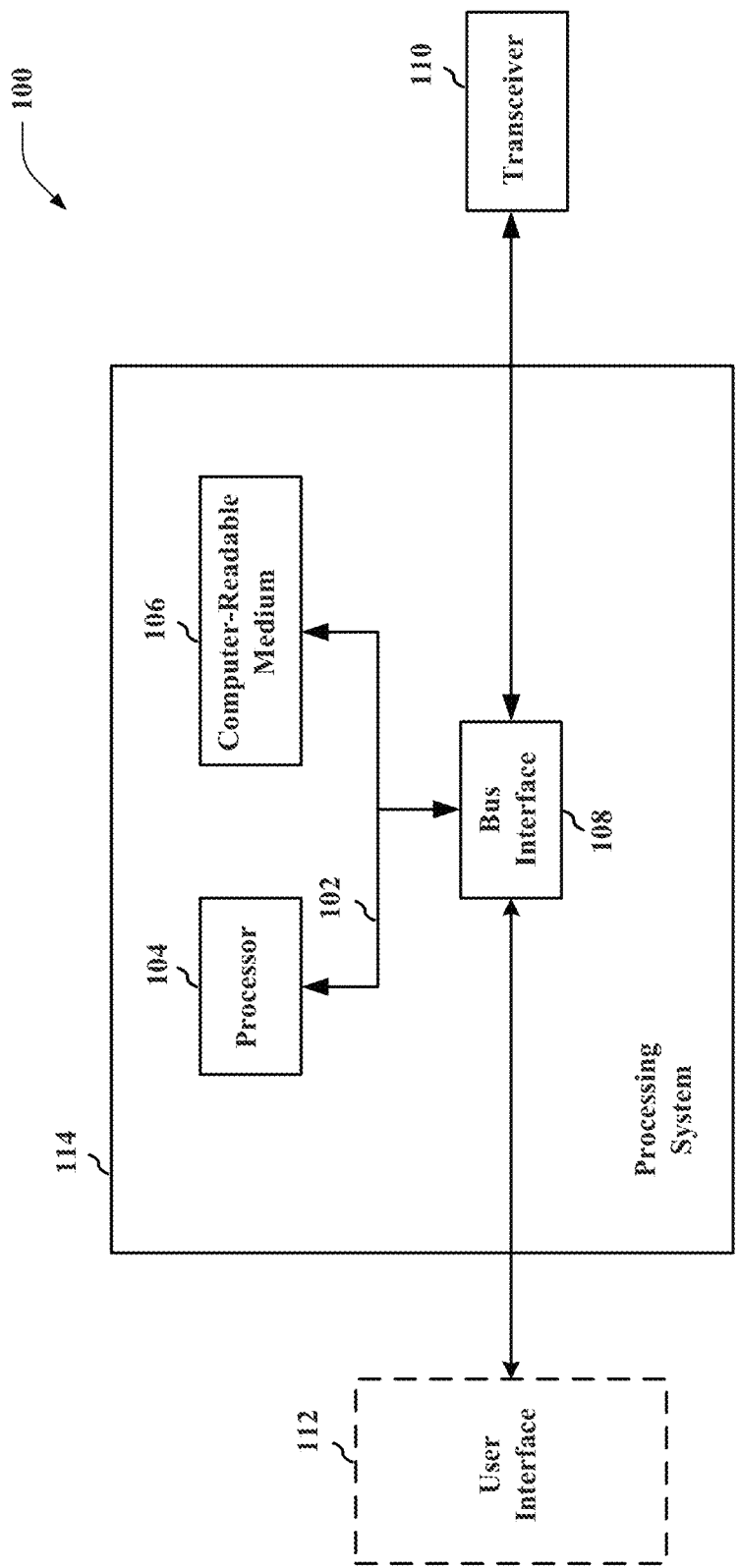
FIG. 1 is a diagram illustrating an example of a hardware implementation for an apparatus employing a processing system.
Figure 2:
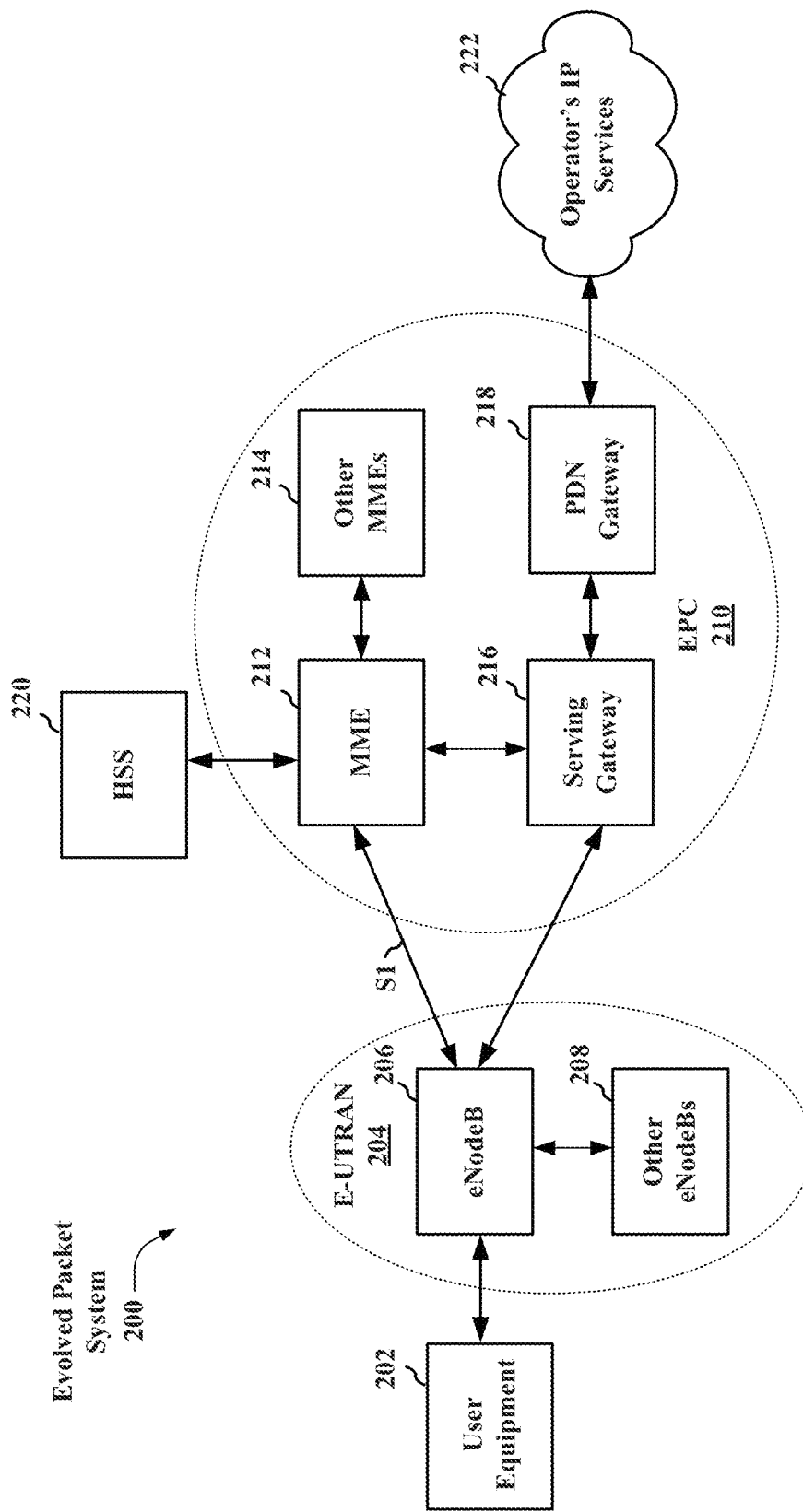
FIG. 2 is a diagram illustrating an example of a network architecture.
Figure 3:
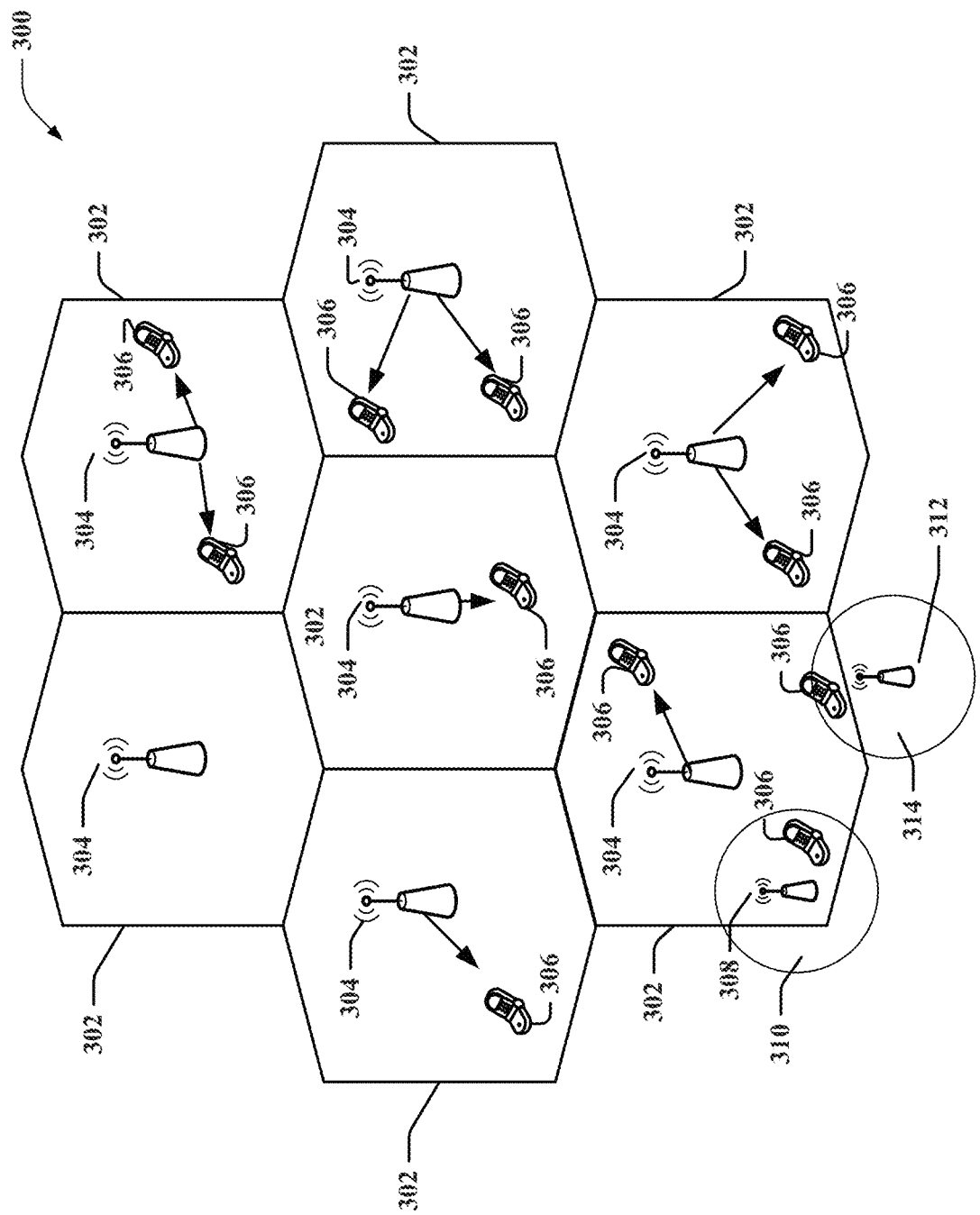
FIG. 3 is a diagram illustrating an example of an access network.

Several aspects of telecommunication systems will now be presented with reference to various apparatus and methods. The systems of FIGS. 1-3 are non-limiting examples of those apparatus and methods within which the teachings described herein may find application and/or implementation. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means (e.g., transmitter and receiver circuitry) for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 104, as utilized in an apparatus 100, may be used to implement any one or more of the processes described below.

In an aspect, the apparatus 100 may be a user equipment (UE) or a base station (BS). The base station may also be referred to by those skilled in the art as a base transceiver station (BTS), a radio base station, a radio transceiver, a transceiver function, a basic service set (BSS), an extended service set (ESS), an access point (AP), a Node B, an eNode B (eNB), mesh node, relay, or some other suitable terminology. A base station may provide wireless access points to a core network for any number of user equipment (UE). Examples of a UE include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, entertainment device, wearable communication device, automobile, mesh network node, M2M component, a game console, or any other similar functioning device. The UE may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

The various concepts presented throughout this disclosure may be implemented across a broad variety of telecommunication systems, network architectures, and communication standards. Existing wireless communication networks, such as those defined according to 3GPP standards for the evolved packet system (EPS), frequently referred to as long-term evolution (LTE) networks, provide for synchronous communications and orthogonal access of multiple users. However, the specific timing requirements in supporting the synchronous communications can have associated costs.

Evolved versions of this network, such as a fifth-generation (5G) network, may provide for many different types of services or applications, including but not limited to web browsing, video streaming, VoIP, mission applications, multi-hop networks, remote operations with real-time feedback (e.g., tele-surgery), etc.

Aspects of the present disclosure are not limited to a particular generation of wireless networks but are generally directed to wireless communication and specifically to 5G networks. However, to facilitate an understanding of such aspects with a known communication platform, examples of such involving LTE are presented in FIGS. 2-3.

FIG. 2 is a diagram illustrating an LTE network architecture 200 employing various apparatuses 100 (See FIG. 1). The LTE network architecture 200 may be referred to as an Evolved Packet System (EPS) 200. The EPS 200 may include one or more user equipment (UE) 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 206 and other eNBs 208. The eNB 206 provides user and control plane protocol terminations toward the UE 202. The eNB 206 may be connected to the other eNBs 208 via an X2 interface (i.e., backhaul). The eNB 206 may also be referred to by those skilled in the art as a base station, a base transceiver station, a radio base station, a radio transceiver, a transceiver function, a basic service set (BSS), an extended service set (ESS), or some other suitable terminology. The eNB 206 provides an access point to the EPC 210 for a UE 202. Examples of UEs 202 are described above. The UE 202 may also be referred to by those skilled in the art using other terms such as is described above.

The eNB 206 is connected by an Si interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 include the Internet, the Intranet, an IP Multimedia Subsystem (IMS), and a PS Streaming Service (PSS).

FIG. 3 is a diagram illustrating an example of an access network in an LTE network architecture. In this example, the access network 300 is divided into a number of cellular regions (cells) 302. One or more lower power class eNBs 308, 312 may have cellular regions 310, 314, respectively, that overlap with one or more of the cells 302. The lower power class eNBs 308, 312 may be femto cells (e.g., home eNBs (HeNBs)), pico cells, or micro cells. A higher power class or macro eNB 304 is assigned to a cell 302 and is configured to provide an access point to the EPC 210 for all the UEs 306 in the cell 302. There is no centralized controller in this example of an access network 300, but a centralized controller may be used in alternative configurations. The eNB 304 is responsible for all radio related functions including radio bearer control, admission control, mobility control, scheduling, security, and connectivity to the serving gateway 216 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 304 may have multiple antennas supporting MIMO technology. The use of MIMO technology enables the eNB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 306 with different spatial signatures, which enables each of the UE(s) 306 to recover the one or more data streams destined for that UE 306. On the uplink, each UE 306 transmits a spatially precoded data stream, which enables the eNB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network may involve a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR). Cyclic prefix (CP) in LTE may be used to mitigate inter-symbol-interference (ISI) and ensure orthogonality among UL signals. The cyclic prefix appended to each OFDM symbol or each SC-FDM symbol may be used to combat intersymbol interference (ISI) caused by delay spread in a multipath channel. A signal transmitted by a cell may reach a UE via multiple signal paths. Delay spread is the difference between the earliest and latest arriving signal copies at the UE. To effectively combat ISI, the cyclic prefix length may be selected to be equal to or greater than the expected delay spread so that the cyclic prefix contains a significant portion of all multipath energies. The cyclic prefix represents a fixed overhead of samples for each OFDM or SC-FDM symbol.

Figure 4:
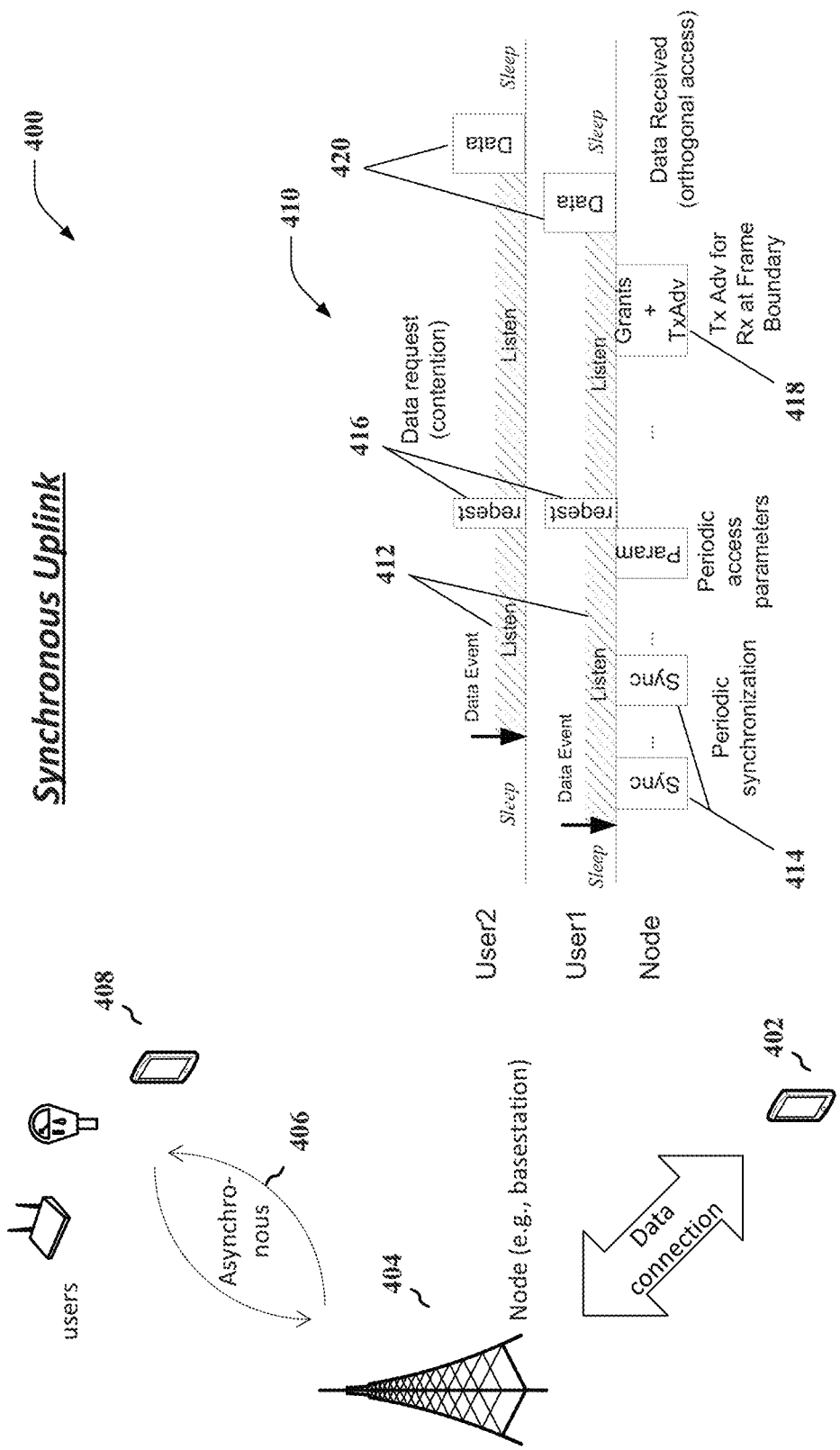
FIG. 4 is a diagram illustrating an example of a synchronous uplink.

FIG. 4 is a diagram illustrating an example of a synchronous uplink. In an aspect, the example can be a legacy type synchronous uplink which might be found in an LTE network or other wireless network. The synchronous uplink 400 can be associated with communication between a user equipment (UE) 402 and a network node (e.g., base station) 404. In an aspect of the present disclosure, asynchronous communication 406 may also be possible between another UE 408 and the network node 404. The timing sub-diagram 410 illustrates the protocol overhead typically associated with establishing a synchronous uplink. More specifically, the users (e.g., "User1" and/or "User2") generally listen (412) for a period of time for synchronization messages (e.g., "Sync") 414 to align with downlink frame boundaries. Users generally then submit a request 416 for a grant (often with timing advance information) 418 so they can transmit and be aligned at the receiver after over-the-air round trip time (RTT) differences. After synchronization and grant, the users finally send data 420. These protocol overhead requirements for establishing synchronous communication, via the synchronous uplink, can be costly in terms of performance for certain network devices on a wireless network, including those that send data at relatively slow data rates, as well as for other network devices on the wireless network.

As to synchronous communication in general, it can be good for link efficiency but has associated costs. For example, at the receiver, synchronous communication can require the receiver to acquire, track, and correct timing before data can be received. At the transmitter, and after the receiver has had the timing configured, the transmitter may need additional timing advance and tight coordination across the entire operating bandwidth before data transfer can occur. Similarly, inter-node synchronization can be beneficial for transmission and interference coordination, but also has associated costs. At base stations, for example, synchronization across base stations may be achievable with macro and/or micro cells. However, some indoor and small cells might not meet the accuracy requirements for synchronization. In addition, such accuracy requirements may be even worse if the cyclic prefix (CP) length is shortened. At relays and various device to device links, there may be additional complexity for autonomous links to keep accurate timing and align with global macro networks. As such, synchronous communication may not be ideal in certain applications.

Aspects of the present disclosure provide an apparatus and method for establishing asynchronous communication without as many protocol overhead requirements as synchronous communication. The asynchronous communication can enable more efficient communications including potential power savings. In an aspect, the apparatus and method for establishing asynchronous communication described herein can improve support for indoor and/or standalone small cells, relays and device to device links. In an aspect, the apparatus and method for establishing asynchronous communication described herein can enable lower power devices to send data with little overhead. In addition, they may enable low latency by sending data immediately upon a triggering event. Aspects of the present disclosure can further enable mixed waveform coexistence to address constraints associated with efficiency, latency, and/or propagation (e.g., mixed symbol durations for low latency, normal mobility, and static). Aspects of the present disclosure can enable graceful degradation when handling other radio access technology interference issues. For example, aspects of the present disclosure can allow native support of coexistence with interferers that are on independent timelines.

Figure 5:
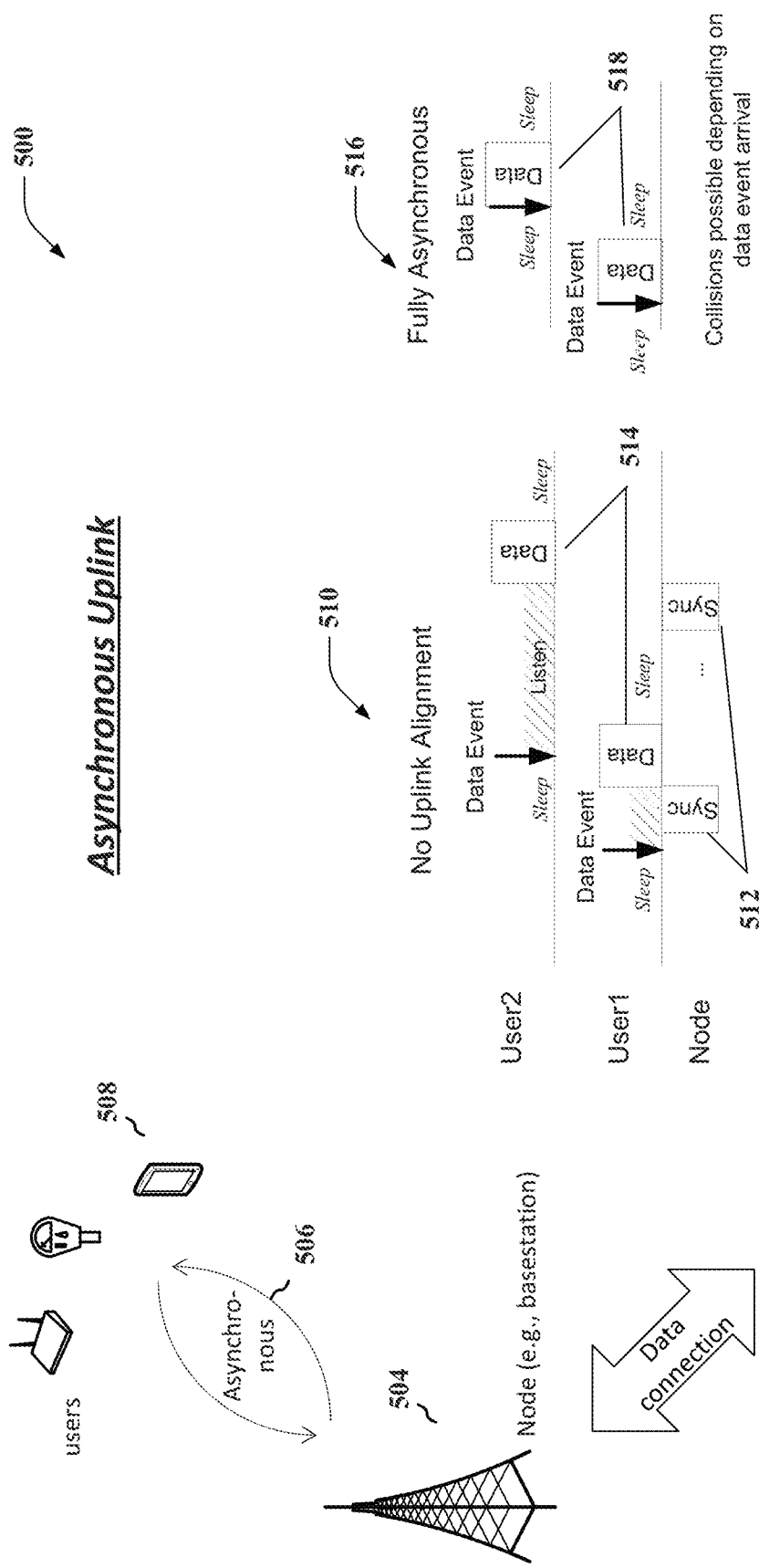
FIG. 5 is a diagram illustrating an example of an asynchronous uplink in accordance with some aspects of the disclosure.

FIG. 5 is a diagram illustrating an example of an asynchronous uplink 500 in accordance with some aspects of the disclosure. The asynchronous uplink 500 can be associated with communication between a user equipment (UE) 502 and a network node (e.g., base station) 504. In an aspect of the present disclosure, asynchronous communication 506 may also be possible between another UE 508 and the network node 504. The first timing sub-diagram 510 illustrates the protocol overhead typically associated with establishing an asynchronous uplink involving operation with no uplink alignment. More specifically, users (e.g., "User1" and "User2") may wait for sync messages 512 but choose to ignore grant messages before sending data 514. The second timing sub-diagram 516 illustrates the protocol overhead typically associated with establishing an asynchronous uplink involving fully asynchronous operation. More specifically, the users may choose to ignore both grants and sync messages when sending data 518.

Thus, in general for asynchronous communications, users may choose to ignore grants or even synchronization messages in order to send information quickly and with low signaling overhead. These more autonomous transaction capabilities can allow the users to save power in certain cases (e.g., sporadic small transmissions). Other advantages are described above.

Figure 6:
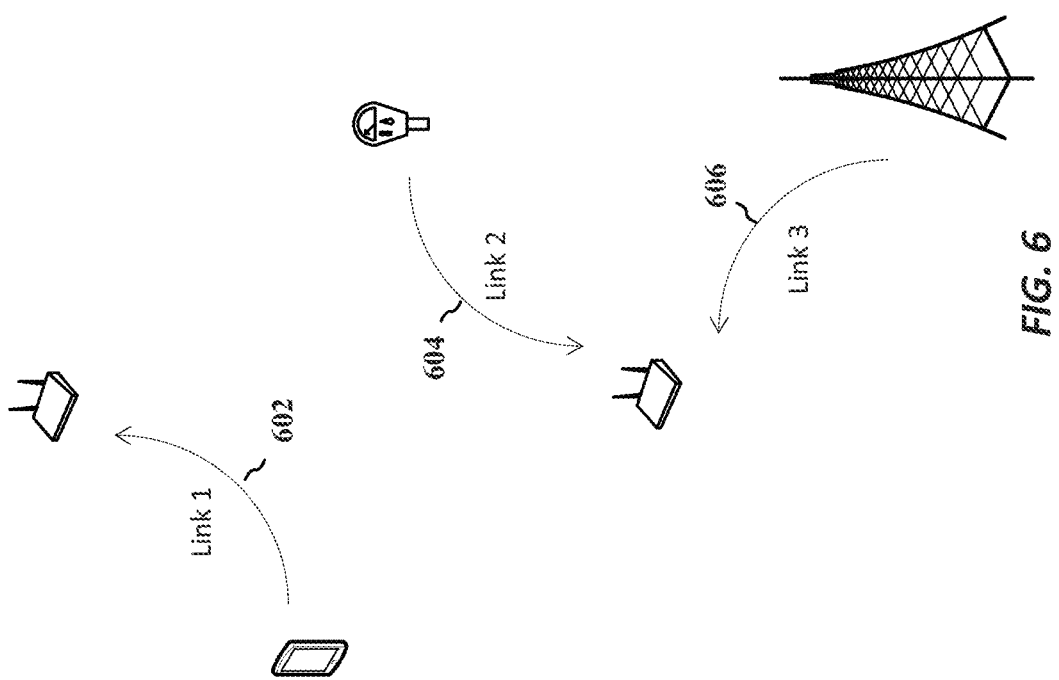
FIG. 6 is a diagram illustrating examples of various communication links.

FIG. 6 is a diagram illustrating examples of various communication links (602, 604, 606). In an aspect it is noted that a link is defined by the associated transmitter and receiver. In such case, each transmitter may have one or multiple receivers (or links). The case where one transmitter communicates with many receivers is similar to a base station downlink. However, there are other network links possible. For example, each receiver may have one or multiple transmitters (or links). The case involving one receiver communicating with many transmitters is similar to a base station uplink, but again this is not the only case. Links between different transmitters and receivers may be within the same system bandwidth. This holds for varying device types (e.g., base station, smartphone, sensor, tablet, machine, etc.). In some instances, the network nodes (e.g., transmitters and/or receivers) establishing the communication links can be referred to as a scheduling entity or a subordinate entity. For example, the apparatus 100 of FIG. 1 may be a user equipment (UE), which may be a scheduling entity or a subordinate entity. In another example, the apparatus 100 of FIG. 1 may be a base station, which may be a scheduling entity.

Figure 7:
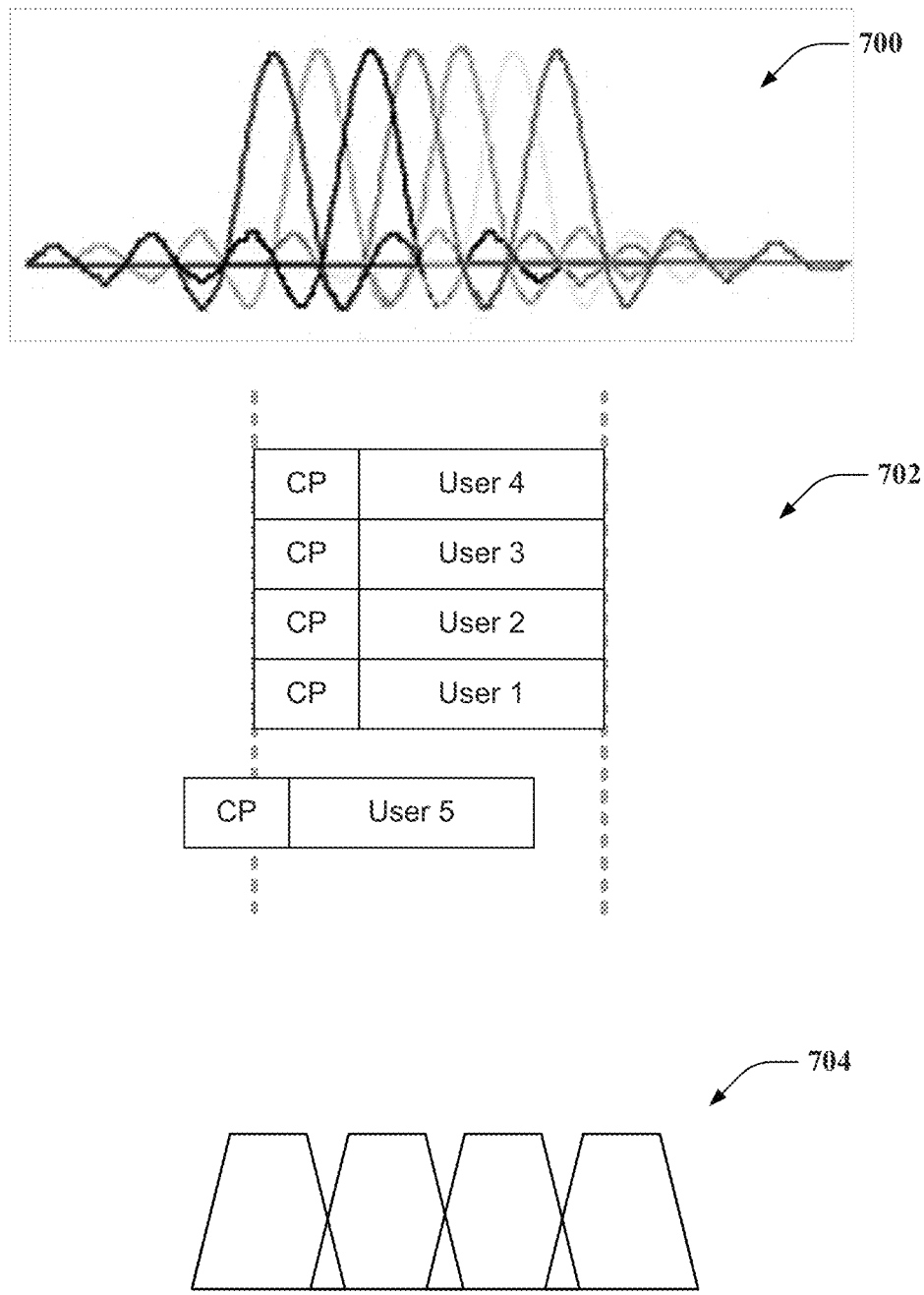
FIG. 7 is a diagram illustrating examples of intercarrier interference (ICI) and a design approach for addressing ICI and enabling asynchronous communication in accordance with some aspects of the disclosure.

FIG. 7 is a diagram illustrating examples of intercarrier interference (ICI) and a design approach for addressing ICI and enabling asynchronous communication in accordance with some aspects of the disclosure. Waveform frequency domain sub-diagram 700 shows how orthogonal frequency division multiple access (OFDMA) signals can suffer from ICI when the subcarriers are not aligned. More specifically, the ICI can be caused by the overlap in frequency with zeros at subcarrier center frequencies. Timing sub-diagram 702 illustrates various sub-frames including the cyclic prefix (CP) followed by user data for several different users. Misalignment of one of the sub-frames (e.g., sub-frame of User 5) can cause ICI (e.g., the ICI depicted in waveform sub-diagram 700). To ameliorate the ICI, an aspect of the present disclosure can involve providing a system with filter bank multicarrier or OFDM with symbol windowing for better sub-band separation. A desirable frequency domain representation of such a system might look like sub-diagram 704 where the carriers in the multicarrier waveform have less overlap. In such case, the system can enable asynchronous operation between links where different symbol numerologies and cyclic prefix lengths can be used per link. Such a system can scale up and scale down the bandwidth as needed.

Figure 8:
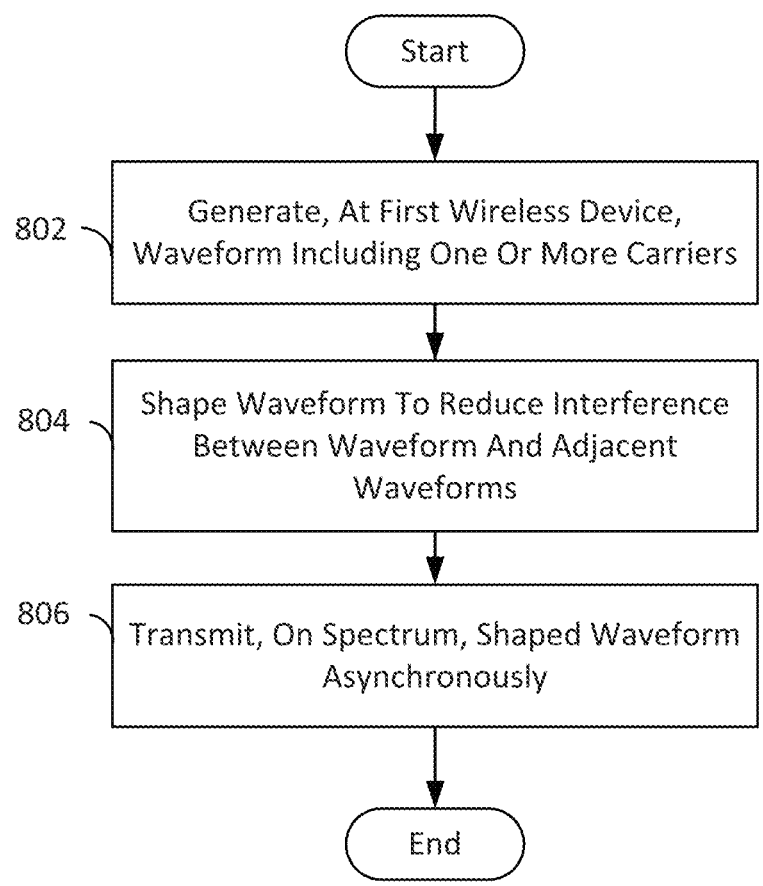
FIG. 8 is a diagram illustrating an exemplary process for operating transmitter circuitry enabled for asynchronous communication in accordance with some aspects of the disclosure.

FIG. 8 is a diagram illustrating an exemplary process 800 for operating transmitter circuitry enabled for asynchronous communication in accordance with some aspects of the disclosure. In an aspect, the process 800 can be performed by the transmitter circuitry of transceiver 110 in FIG. 1 or other suitable circuitry. In block 802, the process generates, at a first wireless device, a waveform including one or more carriers. In one aspect, the process also shares, at the first wireless device, a spectrum including multiple carriers (e.g., where the spectrum may be partitioned across a plurality of wireless devices including the first wireless device).

In block 804, the process shapes the waveform to reduce interference between the waveform and adjacent waveforms (e.g., to enable the first wireless device to transmit asynchronously with respect to another wireless device or to improve the first wireless device's performance when transmitting asynchronously). In an aspect, the process can shape the waveform to reduce interference between the waveform and adjacent waveforms (e.g., those waveforms generated by other wireless devices operating on the spectrum) such that any such interference is less than that of an unshaped waveform. In an aspect, the process can shape the waveform to reduce interference between the waveform and adjacent waveforms (e.g., those waveforms generated by other wireless devices operating on the spectrum) to a preselected level (e.g., preselected maximum level). In one aspect, the preselected level is about −13 Decibel-milliwatts (dBm) across an adjacent 1 mega Hertz (MHz) of the spectrum. In block

806, the process transmits, on a spectrum, the shaped waveform asynchronously (e.g., with respect to another wireless device on the spectrum). As will be discussed in more detail below, this process may be specifically implemented using (1) orthogonal frequency division multiple access (OFDMA) modulation with weighted overlap and add (WOLA) filtering, (2) multicarrier frequency domain equalization (FDE), or (3) other schemes suitable for enabling asynchronous communication.

Figure 9:
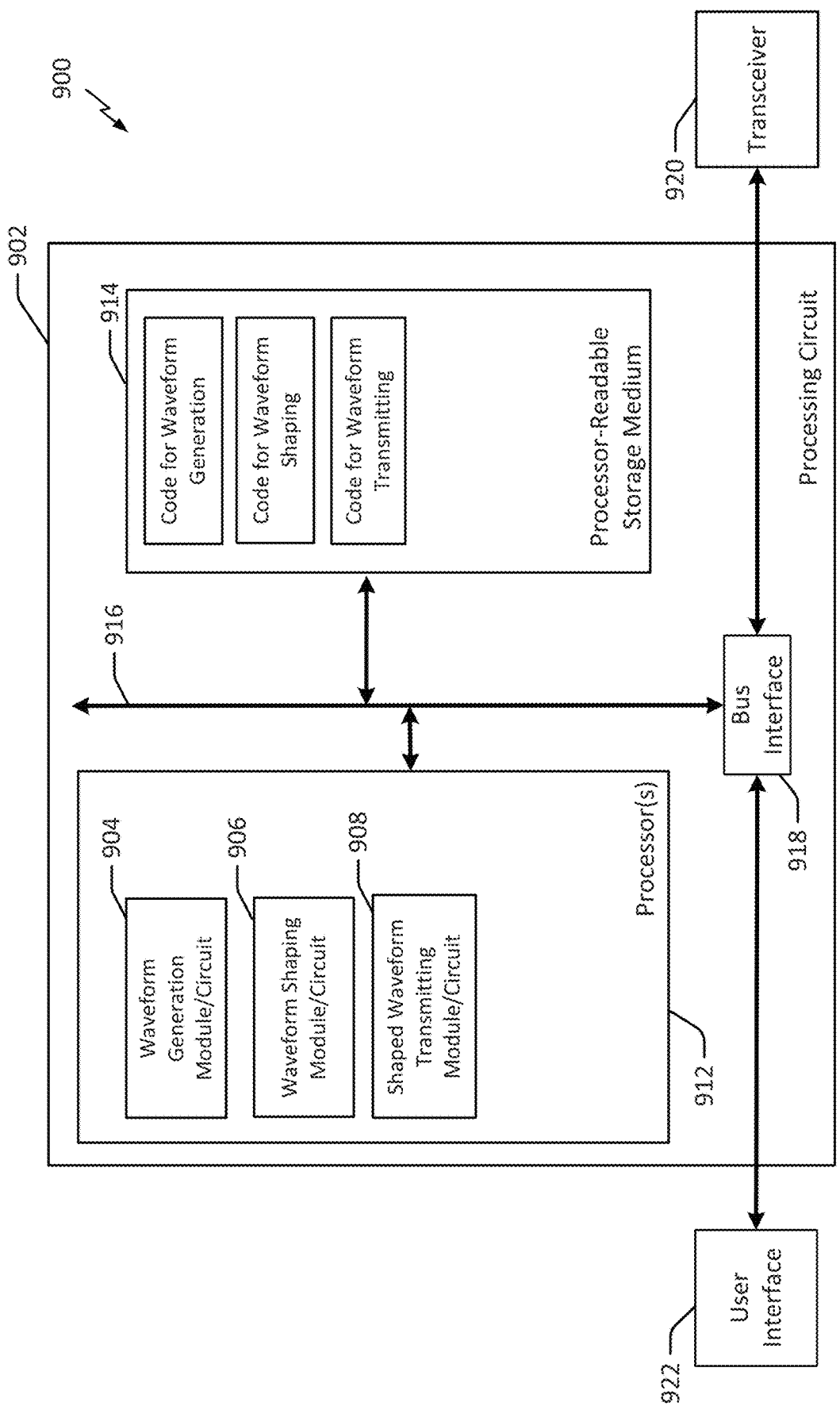
FIG. 9 is a diagram illustrating a simplified example of a hardware implementation for an apparatus employing a processing circuit and adapted for operating transmitter circuitry in accordance with some aspects of the disclosure.

FIG. 9 is a diagram 900 illustrating a simplified example of a hardware implementation for an apparatus employing a processing circuit 902 and adapted for operating transmitter circuitry in accordance with some aspects of the disclosure. The processing circuit 902 may be provided in accordance with certain aspects illustrated in relation to the processing system 114 of FIG. 1. The processing circuit 902 has one or more processors 912 that may include a microprocessor, microcontroller, digital signal processor, a sequencer and/or a state machine. The processing circuit 902 may be implemented with a bus architecture, represented generally by the bus 916. The bus 916 may include any number of interconnecting buses and bridges depending on the specific application of the processing circuit 902 and the overall design constraints. The bus 916 links together various circuits including a computer-readable storage medium 914 and the one or more processors 912 and/or hardware devices that cooperate to perform certain functions described herein, and which are represented by the modules and/or circuits 904, 906, 908 and 910. The bus 916 may also link various other circuits such as timing sources, timers, peripherals, voltage regulators, and power management circuits. A bus interface 918 may provide an interface between the bus 916 and other devices such as a transceiver 920 or a user interface 922. The transceiver 920 may provide a wireless communications link for communicating with various other apparatus. In some instances the transceiver 920 and/or user interface 922 may connect directly to the bus 916.

The processor 912 is responsible for general processing, including the execution of software stored as code on the computer-readable storage medium 914. The software, when executed by the processor 912, configures one or more components of the processing circuit 902 such that the processing circuit 902 may perform the various functions described above for any particular apparatus. The computer-readable storage medium 914 may also be used for storing data that is manipulated by the processor 912 when executing software. The processing circuit 902 further includes at least one of the modules 904, 906, and 908. The modules 904, 906, and 908 may be software modules running in the processor 912 loaded from code resident and/or stored in the computer readable storage medium 914, one or more hardware modules coupled to the processor 912, or some combination thereof. The modules 904, 906, and/or 908 may include microcontroller instructions, state machine configuration parameters, or some combination thereof.

Module and/or circuit 904 may be configured to generate, at a first wireless device, a waveform including one or more carriers. In one aspect, the module and/or circuit 906 may be configured to perform the functions described in relation to block 802 in FIG. 8, block 1302 in FIG. 13, and/or block 1702 in FIG. 17.

Module and/or circuit 906 may be configured to shape the waveform to reduce interference between the waveform and adjacent waveforms (e.g., to enable the first wireless device to transmit asynchronously or to improve the first wireless device's performance when transmitting asynchronously). In one aspect, the module and/or circuit 906 may be configured to perform the functions described in relation to block 804 in FIG. 8, block 1304 in FIG. 13, and/or block 1704 in FIG. 17.

Module and/or circuit 908 may be configured to transmit, on a spectrum, the shaped waveform asynchronously. In one aspect, the module and/or circuit 908 may be configured to perform the functions described in relation to block 806 in FIG. 8, block 1306 in FIG. 13, and/or block 1706 in FIG. 17.

Figure 10:
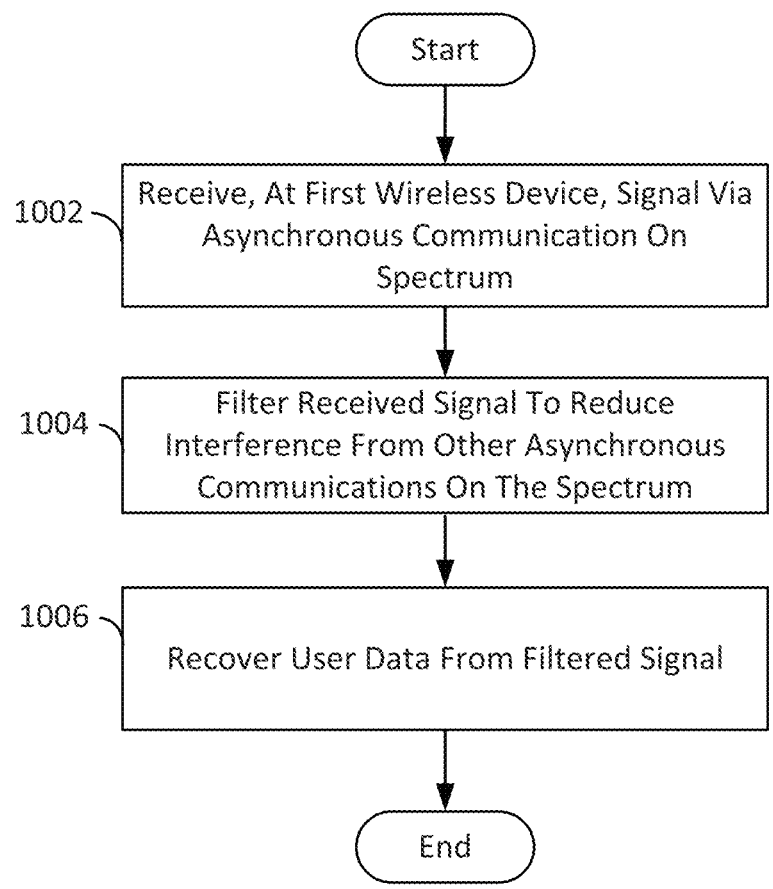
FIG. 10 is a diagram illustrating an exemplary process for operating receiver circuitry enabled for asynchronous communication in accordance with some aspects of the disclosure.

FIG. 10 is a diagram illustrating an exemplary process 1000 for operating receiver circuitry enabled for asynchronous communication in accordance with some aspects of the disclosure. In an aspect, the process 1000 can be performed by the receiver circuitry of transceiver 110 in FIG. 1 or other suitable circuitry. In block 1002, the process receives, at a first wireless device, a signal via asynchronous communication on a spectrum. In one aspect, the process shares, at the first wireless device, the spectrum including multiple carriers (e.g., where the spectrum may be partitioned across a plurality of wireless devices that include the first wireless device and where each of the plurality of wireless devices is allocated different carriers of the spectrum). In block 1004, the process filters the received signal to reduce interference from other asynchronous communications on the spectrum. In an aspect, the process can filter the received signal to reduce interference between the received signal and adjacent waveforms/signals (e.g., those waveforms generated by other wireless devices operating on the spectrum) on the spectrum such that any such interference is less than that of an unfiltered waveform. In an aspect, the process can filter the received signal to reduce interference between the received signal and adjacent waveforms/signals (e.g., those waveforms generated by other wireless devices operating on the spectrum) to a preselected level (e.g., preselected maximum level). In one aspect, the preselected level is about −13 dBm across an adjacent 1 MHz of the spectrum. In block 1006, the process recovers user data from the filtered signal. As will be discussed in more detail below, this process may be specifically implemented using (1) orthogonal frequency division multiple access (OFDMA) modulation with weighted overlap and add (WOLA) filtering, (2) multicarrier frequency domain equalization (FDE), or (3) other schemes suitable for enabling asynchronous communication.

Figure 11:
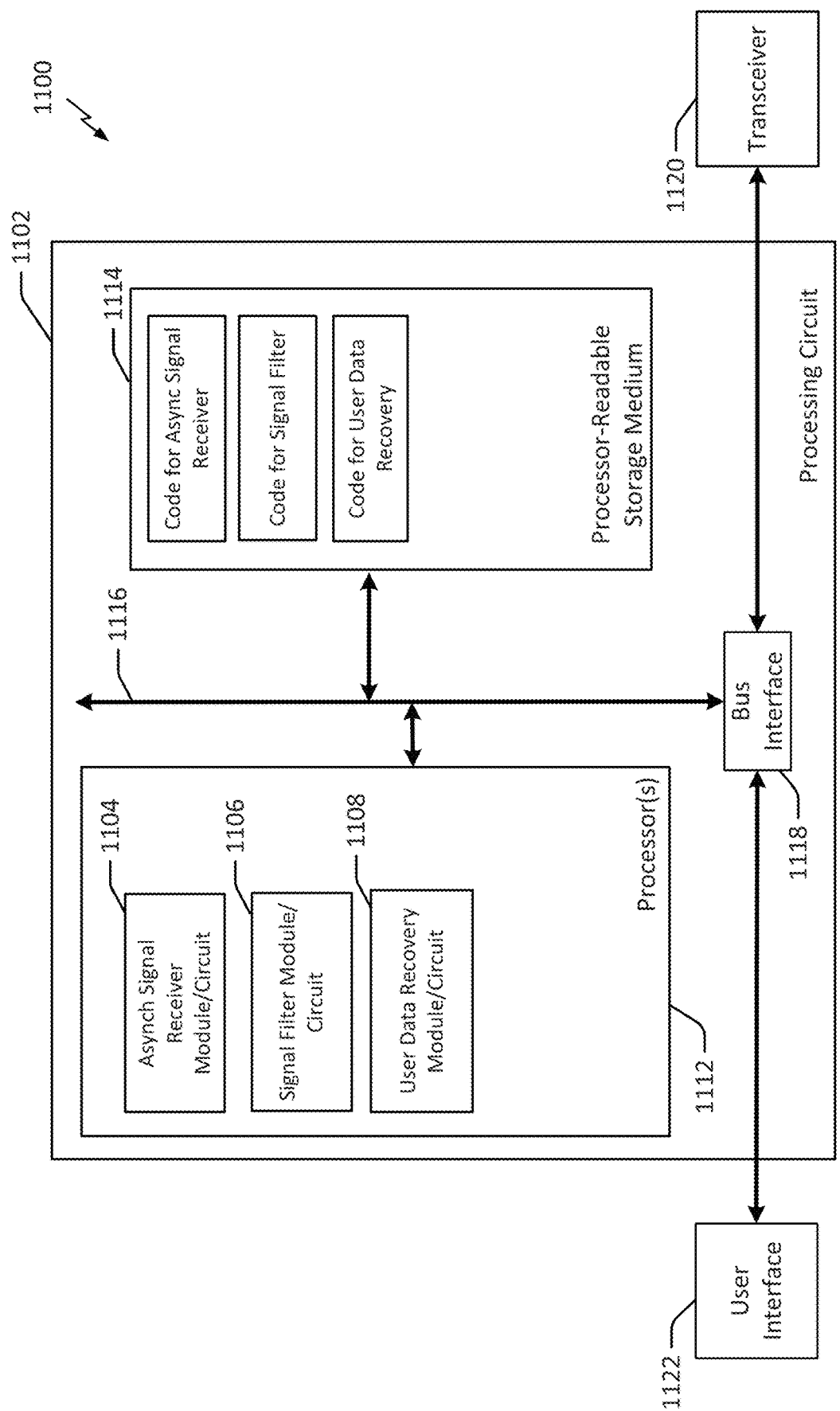
FIG. 11 is a diagram illustrating a simplified example of a hardware implementation for an apparatus employing a processing circuit and adapted for operating receiver circuitry in accordance with some aspects of the disclosure.

FIG. 11 is a diagram 1100 illustrating a simplified example of a hardware implementation for an apparatus employing a processing circuit 1102 and adapted for operating receiver circuitry in accordance with some aspects of the disclosure. The processing circuit 1102 may be provided in accordance with certain aspects illustrated in relation to the processing system 114 of FIG. 1. The processing circuit 1102 has one or more processors 1112 that may include a microprocessor, microcontroller, digital signal processor, a sequencer and/or a state machine. The processing circuit 1102 may be implemented with a bus architecture, represented generally by the bus 1116. The bus 1116 may include any number of interconnecting buses and bridges depending on the specific application of the processing circuit 1102 and the overall design constraints. The bus 1116 links together various circuits including a computer-readable storage medium 1114 and the one or more processors 1112 and/or hardware devices that cooperate to perform certain functions described herein, and which are represented by the modules and/or circuits 1104, 1106, 1108 and 1110. The bus 1116 may also link various other circuits such as timing sources, timers, peripherals, voltage regulators, and power management circuits. A bus interface 1118 may provide an interface between the bus 1116 and other devices such as a transceiver 1120 or a user interface 1122. The transceiver 1120 may provide a wireless communications link for communicating with various other apparatus. In some instances the transceiver 1120 and/or user interface 1122 may connect directly to the bus 1116.

The processor 1112 is responsible for general processing, including the execution of software stored as code on the computer-readable storage medium 1114. The software, when executed by the processor 1112, configures one or more components of the processing circuit 1102 such that the processing circuit 1102 may perform the various functions described above for any particular apparatus. The computer-readable storage medium 1114 may also be used for storing data that is manipulated by the processor 1112 when executing software. The processing circuit 1102 further includes at least one of the modules 1104, 1106, and 1108. The modules 1104, 1106, and 1108 may be software modules running in the processor 1112 loaded from code resident and/or stored in the computer readable storage medium 1114, one or more hardware modules coupled to the processor 1112, or some combination thereof. The modules 1104, 1106, and/or 1108 may include microcontroller instructions, state machine configuration parameters, or some combination thereof.

Module and/or circuit 1104 may be configured to receive, at the first wireless device, a signal via asynchronous communication on the spectrum. In one aspect, the module and/or circuit 1104 may be configured to perform the functions described in relation to block 1002 in FIG. 10, block 1502 in FIG. 15, and/or block 1902 in FIG. 19.

Module and/or circuit 1106 may be configured to filter the received signal to reduce interference from other asynchronous communications on the spectrum. In one aspect, the module and/or circuit 1106 may be configured to perform the functions described in relation to block 1004 in FIG. 10, block 1504 in FIG. 15, and/or block 1904 in FIG. 19.

Module and/or circuit 1108 may be configured to recover user data from the filtered signal. In one aspect, the module and/or circuit 1108 may be configured to perform the functions described in relation to block 1006 in FIG. 10, block 1506 in FIG. 15, and/or block 1906 in FIG. 19.

Figure 12:
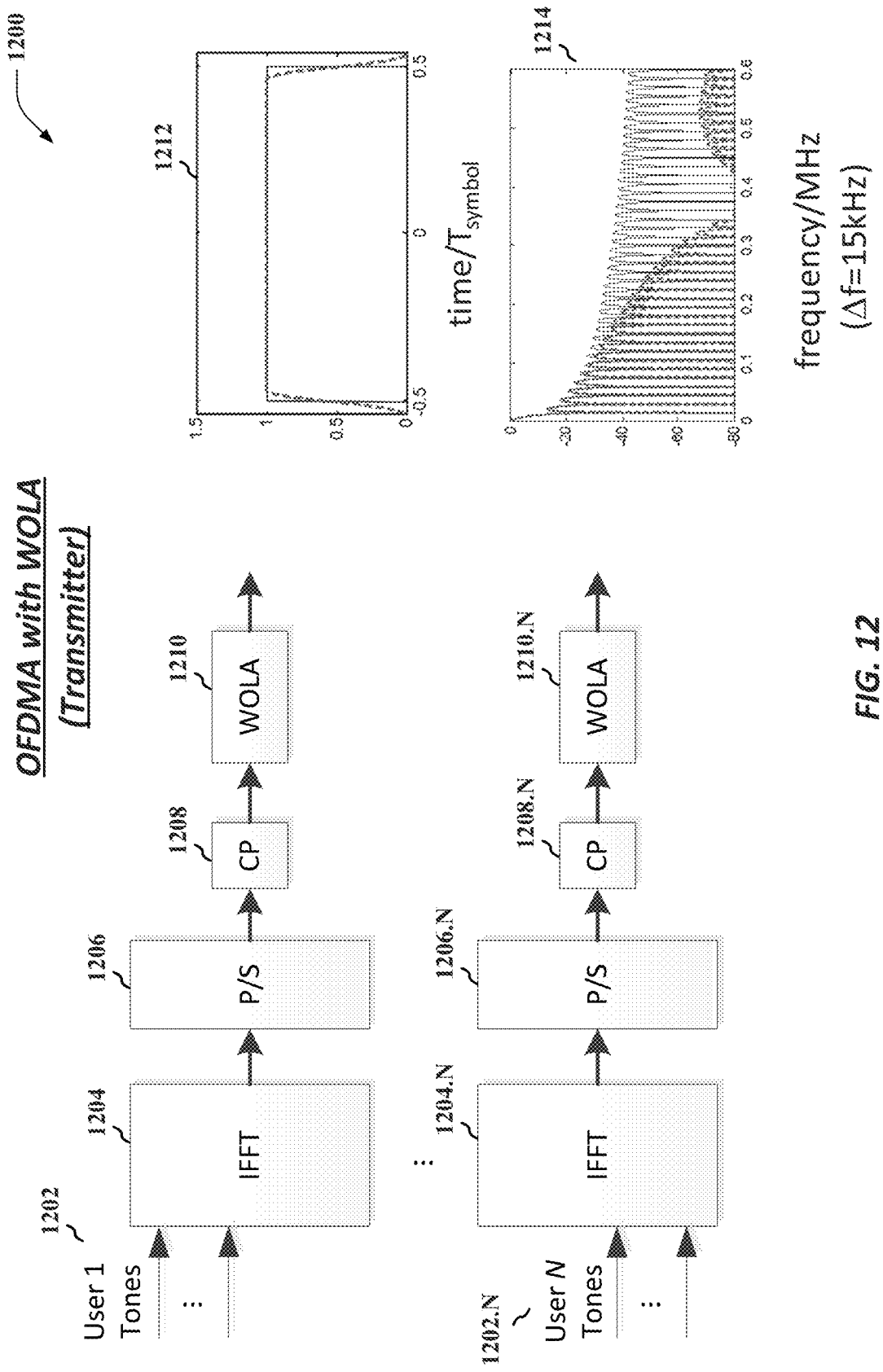
FIG. 12 is a diagram illustrating an example of transmitter circuitry for enabling asynchronous communication using orthogonal frequency division multiple access (OFDMA) modulation with weighted overlap and add (WOLA) filtering in accordance with some aspects of the disclosure.

FIG. 12 is a diagram illustrating an example of transmitter circuitry 1200 for enabling asynchronous communication using orthogonal frequency division multiple access (OFDMA) modulation with weighted overlap and add (WOLA) filtering in accordance with some aspects of the disclosure. The transmitter circuitry 1200 receives a number of user tones 1202 that are provided to an inverse fast Fourier transform (IFFT) 1204 (e.g., for OFDMA modulation). The output of the IFFT 1204 is provided to a parallel to serial (P/S) block 1206. A cyclic prefix (CP) block 1208 adds a cyclic prefix (CP) to the output of the P/S block 1206. The output of the CP block 1208 (e.g., transmit signal) is provided to a WOLA filter 1210. Sub-diagram 1212 illustrates an example of the shape of the filtering waveform as provided by the WOLA filter 1210. Sub-diagram 1214 illustrates an example of the shape of the resulting cumulative waveform after filtering by the WOLA filter 1210.

In an aspect, the WOLA filter 1210 uses the pulse-shape window 1212 with overlap and add to preserve circularity and reduce side lobes in the transmit signal. This is illustrated more specifically in FIG. 26. Each OFDM symbol, consisting of the IFFT output 2602 and a cyclic prefix 2606, may be suitably extended further with a small prefix (beyond the cyclic prefix) and small post-fix upon which a left edge weighting function 2604 and right edge weighting function 2608 may be applied to the edges of the symbol. Each symbol may then be overlapped with previous and upcoming symbols in 2610 at the points where the weighting functions were applied. This process effectively tapers the transitions between symbols, and results in a tighter rolloff for the spectrum of the waveform.

While FIG. 12 illustrates the transmitter circuitry 1200 as including a first transmitter chain (1202, 1204, 1206, 1208, 1210), the transmitter circuitry 1200 may also include a second transmitter chain (1202.N, 1204.N, 1206.N, 1208.N, 1210.N) and additional transmitter chains depending on the number of user tones (e.g., up to N user tones) supplied to the transmitter circuitry 1200.

In an aspect, use of aggressive WOLA at the transmitter can improve tolerance to asynchronism. For example, an aggressive choice of window size at the transmitter WOLA, such that it is a larger fraction of the cyclic prefix, can improve tolerance to asynchronism. Users providing the input tones may adopt different symbol numerologies and use guard tones. In an aspect, methods described herein can implement this technique to achieve separation between synchronous and asynchronous carriers composed of OFDM waveforms, or waveforms which can be demodulated with similarly low complexity, i.e., frequency domain equalization (FDE).

Figure 13:
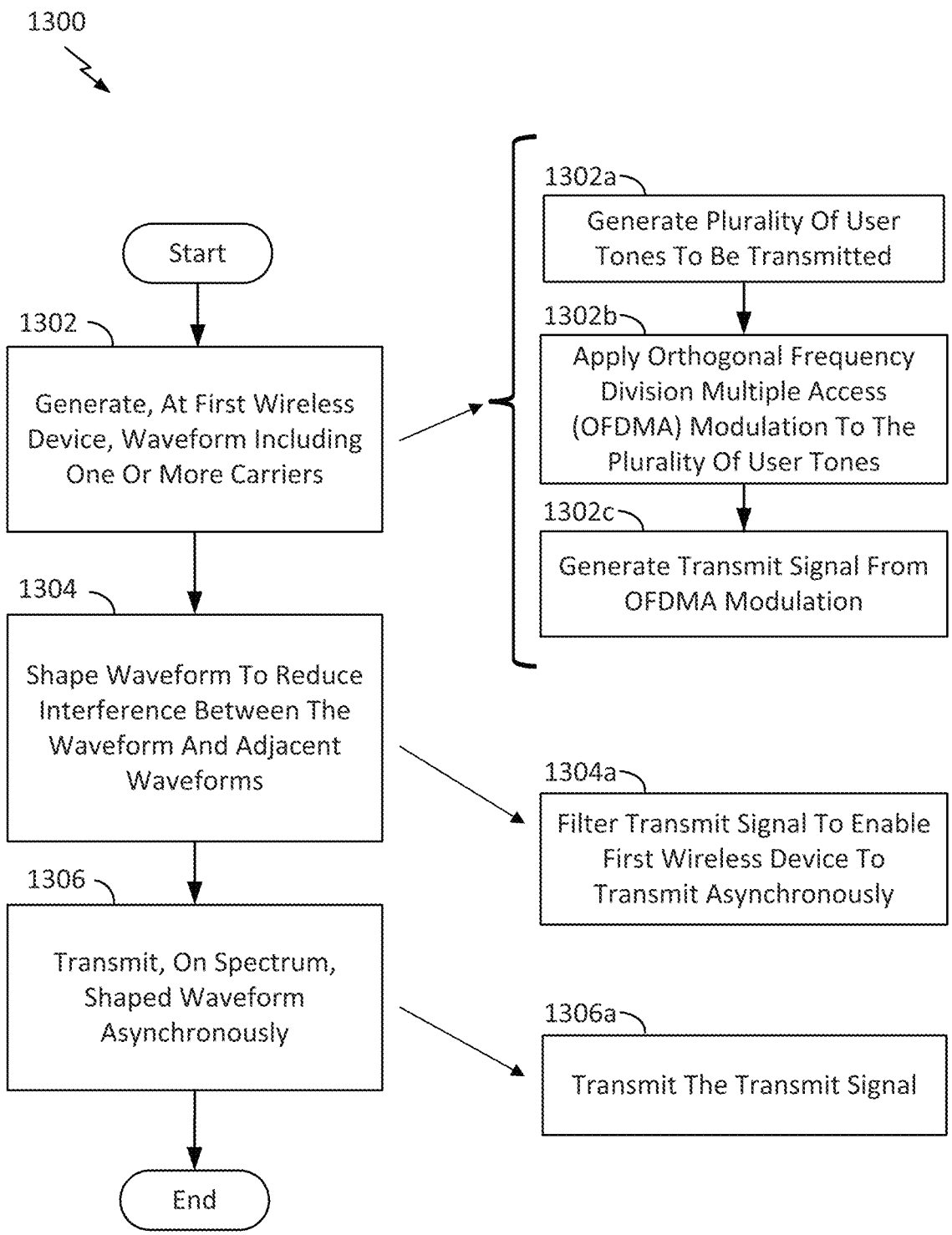
FIG. 13 is a diagram illustrating an exemplary process for operating transmitter circuitry enabled for asynchronous communication using orthogonal frequency division multiple access (OFDMA) modulation with weighted overlap and add (WOLA) filtering in accordance with some aspects of the disclosure.

FIG. 13 is a diagram illustrating an exemplary process 1300 for operating transmitter circuitry enabled for asynchronous communication using orthogonal frequency division multiple access (OFDMA) modulation with weighted overlap and add (WOLA) filtering in accordance with some aspects of the disclosure. In an aspect, the process 1300 can be performed by the transmitter circuitry of FIG. 12 or other suitable circuitry.

In block 1302, the process generates, at the first wireless device, a waveform to be transmitted where the waveform includes one or more carriers. In one aspect, this can be performed by block 906 in FIG. 9. In sub-block 1302a of block 1302, the process generates a plurality of user tones to be transmitted. In one aspect, this can be performed by block 1202 in FIG. 12. In sub-block 1302b of block 1302, the process applies orthogonal frequency division multiple access (OFDMA) modulation to the plurality of user tones. In one aspect, this can be performed by block 1204 in FIG. 12. In sub-block 1302c of block 1302, the process generates a transmit signal from the OFDMA modulation. In one aspect, this can be performed by blocks 1206 and/or 1208 in FIG. 12.

In block 1304, the process shapes the waveform to reduce interference between the waveform and adjacent waveforms (e.g., to enable the first wireless device to transmit asynchronously or to improve the first wireless device's performance when transmitting asynchronously). In one aspect, this can be performed by block 906 in FIG. 9. In sub-block 1304a of block 1304, the process filters the transmit signal to enable the first wireless device to transmit asynchronously. In one aspect, the process filters the transmit signal in sub-block 1304a using a weighted overlap and add filter (e.g., such as the WOLA filter of block 1210 in FIG. 12). In one aspect, the process filters the transmit signal to reduce interference between the waveform (e.g., the transmit signal) and adjacent waveforms (e.g., other signals adjacent to the transmit signal on the spectrum) and to enable the first wireless device to transmit asynchronously or to improve the first wireless device's performance when transmitting asynchronously.

In block 1306, the process transmits, on the spectrum, the shaped waveform asynchronously. In sub-block 1306a of block 1306, the process transmits the transmit signal (e.g., the filtered transmit signal). In one aspect, this can be performed by block 110 in FIG. 1, block 908 in FIG. 9, and/or block 1200 in FIG. 12.

In one aspect, the process 1300 also handles collisions between users. For example, in one aspect, the process provides a preselected bandwidth for asynchronous communications on a wireless network, and then recovers signals from two preselected wireless devices communicating asynchronously, where the recovering can involve using code division multiple access across the two preselected wireless devices. In other cases, other collision handling techniques may be used.

Figure 14:
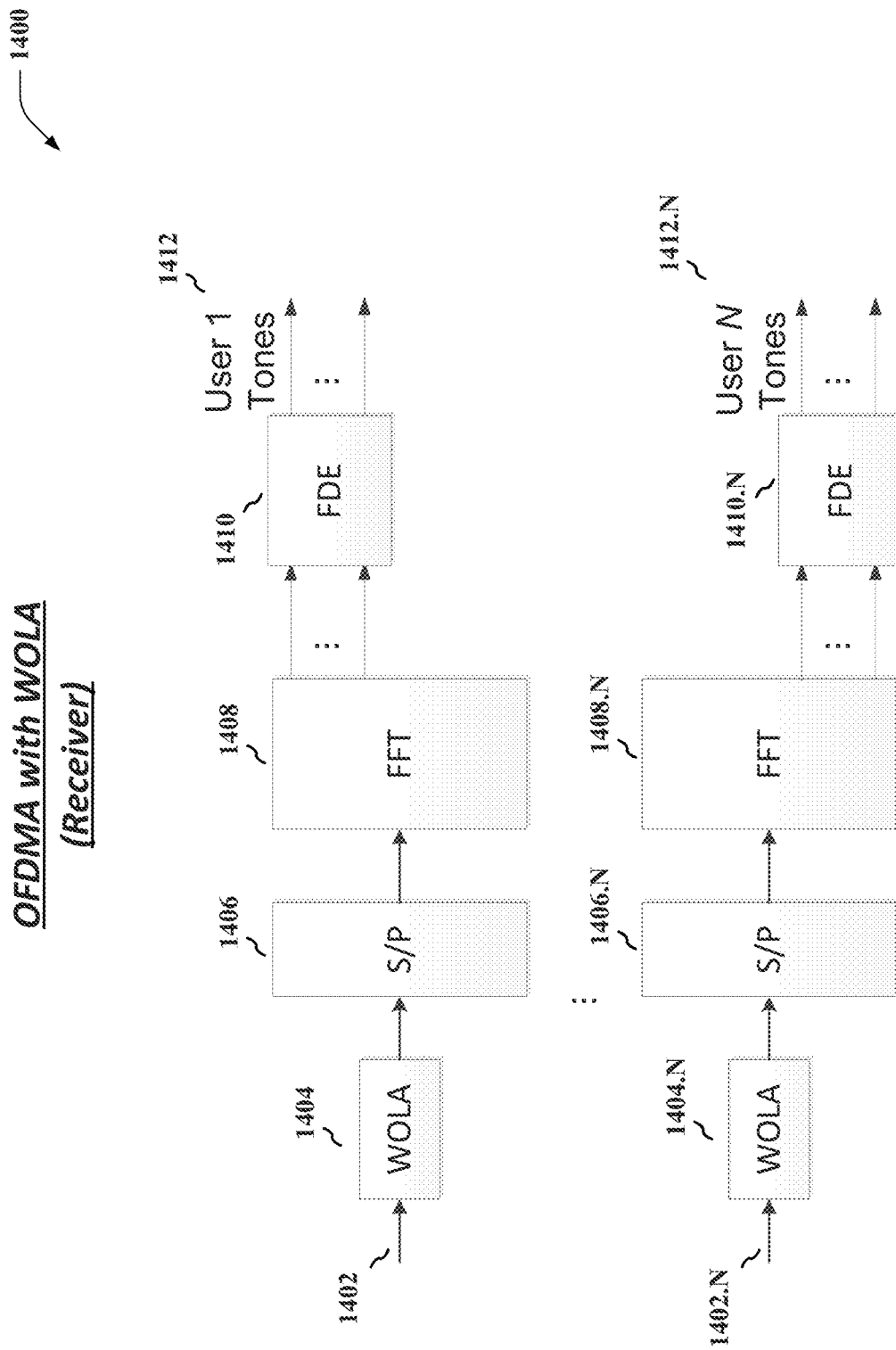
FIG. 14 is a diagram illustrating an example of receiver circuitry for enabling asynchronous communication using orthogonal frequency division multiple access (OFDMA) modulation with weighted overlap and add (WOLA) filtering in accordance with some aspects of the disclosure.

FIG. 14 is a diagram illustrating an example of receiver circuitry 1400 for enabling asynchronous communication using orthogonal frequency division multiple access (OFDMA) modulation with weighted overlap and add (WOLA) filtering in accordance with some aspects of the disclosure. The receiver circuitry 1400 receives signal 1402 (e.g., from a user/wireless device in an OFDMA communication system) provided to a WOLA filter 1404. The output of the WOLA filter 1404 (e.g., to reduce interference from other users communicating asynchronously in the OFDMA communication system) is provided to a serial to parallel (S/P) block 1406. The output of the S/P block 1406 is provided to a fast Fourier transform (FFT) block 1408 (e.g., to perform OFDMA demodulation). The outputs of the FFT block 1408 are provided to a frequency domain equalization (FDE) block 1410 which generates/recovers output user tones 1412.

While FIG. 14 illustrates the receiver circuitry 1400 as including a first receiver chain (1402, 1404, 1206, 1408, 1410, 1412), the receiver circuitry 1400 may also include a second receiver chain (1402.N, 1404.N, 1406.N, 1408.N, 1410.N, 1412.N) and additional receiver chains depending on the number of user tones (e.g., up to N user tones) to be recovered by the receiver circuitry 1400.

Thus, a WOLA filter 1404 can be included in the receiver circuitry 1400 to further reduce intercarrier interference (ICI). Alignment and WOLA shape can be adjusted based on the level of interference (e.g., ICI) and the multipath delay spread. In an aspect, the receiver circuitry 1400 does not include the WOLA filter.

Figure 15:
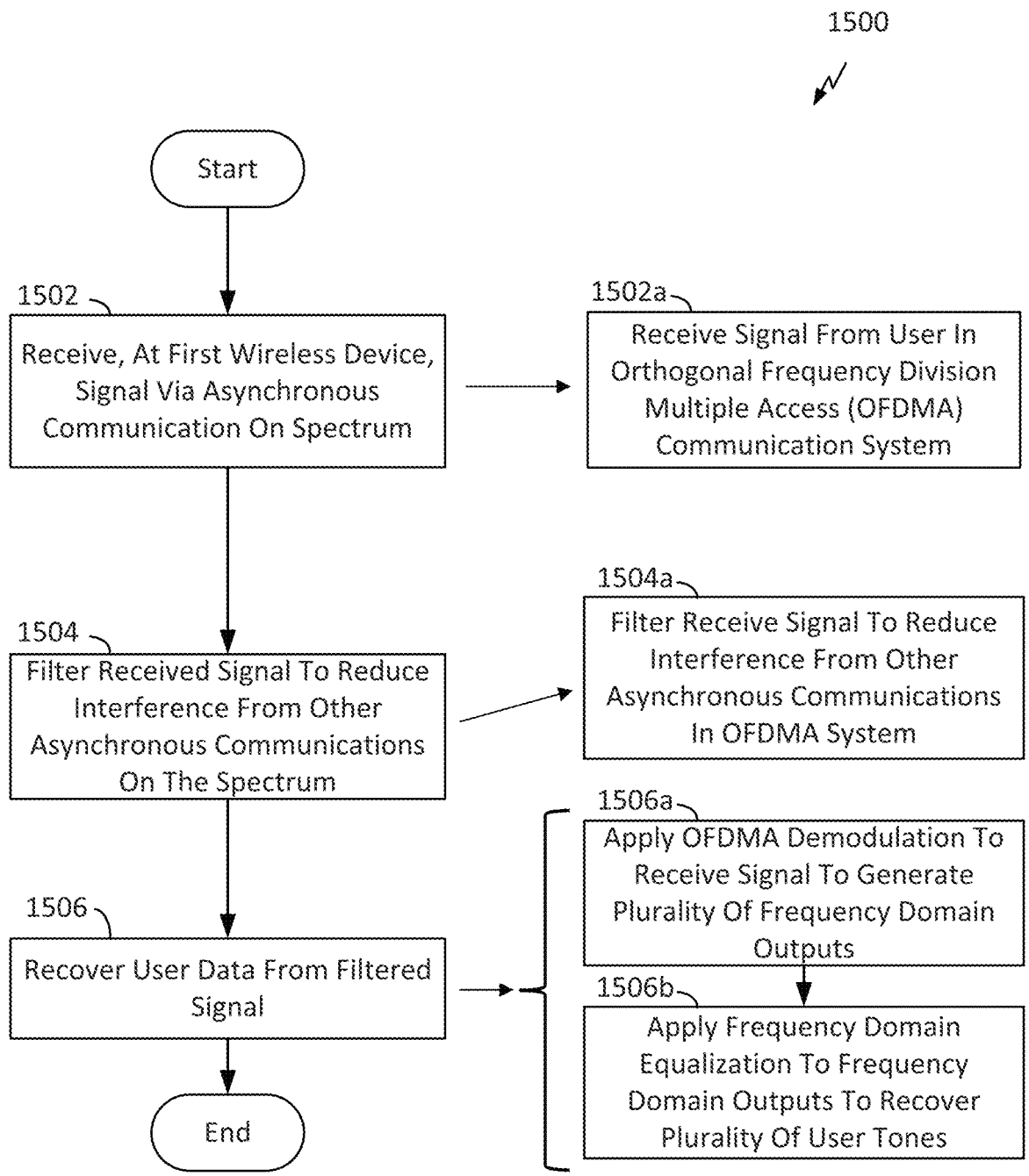
FIG. 15 is a diagram illustrating an exemplary process for operating receiver circuitry enabled for asynchronous communication using orthogonal frequency division multiple access (OFDMA) modulation with weighted overlap and add (WOLA) filtering in accordance with some aspects of the disclosure.

FIG. 15 is a diagram illustrating an exemplary process 1500 for operating receiver circuitry enabled for asynchronous communication using orthogonal frequency division multiple access (OFDMA) modulation with weighted overlap and add (WOLA) filtering in accordance with some aspects of the disclosure. In an aspect, the process 1500 can be performed by the receiver circuitry of FIG. 14 or other suitable circuitry.

In block 1502, the process receives, at a first wireless device, a signal via asynchronous communication on a spectrum. In one aspect, this can be performed by block 1104 in FIG. 11. In sub-block 1502a of block 1502, the process receives a signal from a user in an orthogonal frequency division multiple access (OFDMA) communication system. In one aspect, this can be performed by block 1402 in FIG. 14.

In block 1504, the process filters the received signal to reduce interference from other asynchronous communications on the spectrum. In one aspect, this can be performed by block 1106 in FIG. 11 and/or block 1404 in FIG. 14. In sub-block 1504a of block 1504, the process filters the receive signal to reduce interference from other asynchronous communications in the OFDMA system. In an aspect, the process filters the receive signal in block 1504a using a weighted overlap and add filter (e.g., such as the WOLA filter 1404 of FIG. 14).

In block 1506, the process recovers user data from the filtered signal. In one aspect, this can be performed by block 1108 in FIG. 11 and/or blocks 1406, 1408, and/or 1410 in FIG. 14. In sub-block 1506a of block 1506, the process applies an OFDMA demodulation to the receive signal to generate a plurality of frequency domain outputs. In one aspect, this can be performed by block 1408 in FIG. 14. In sub-block 1506b of block 1506, the process applies frequency domain equalization (FDE) to the frequency domain outputs to recover a plurality of user tones. In one aspect, this can be performed by block 1410 in FIG. 14.

In one aspect, the process 1500 also handles collisions between users. For example, in one aspect, the process provides a preselected bandwidth for asynchronous communications on a wireless network, and then recovers signals from two preselected wireless devices communicating asynchronously, where the recovering can involve using code division multiple access across the two preselected wireless devices. In other cases, other collision handling techniques may be used.

Figure 16:
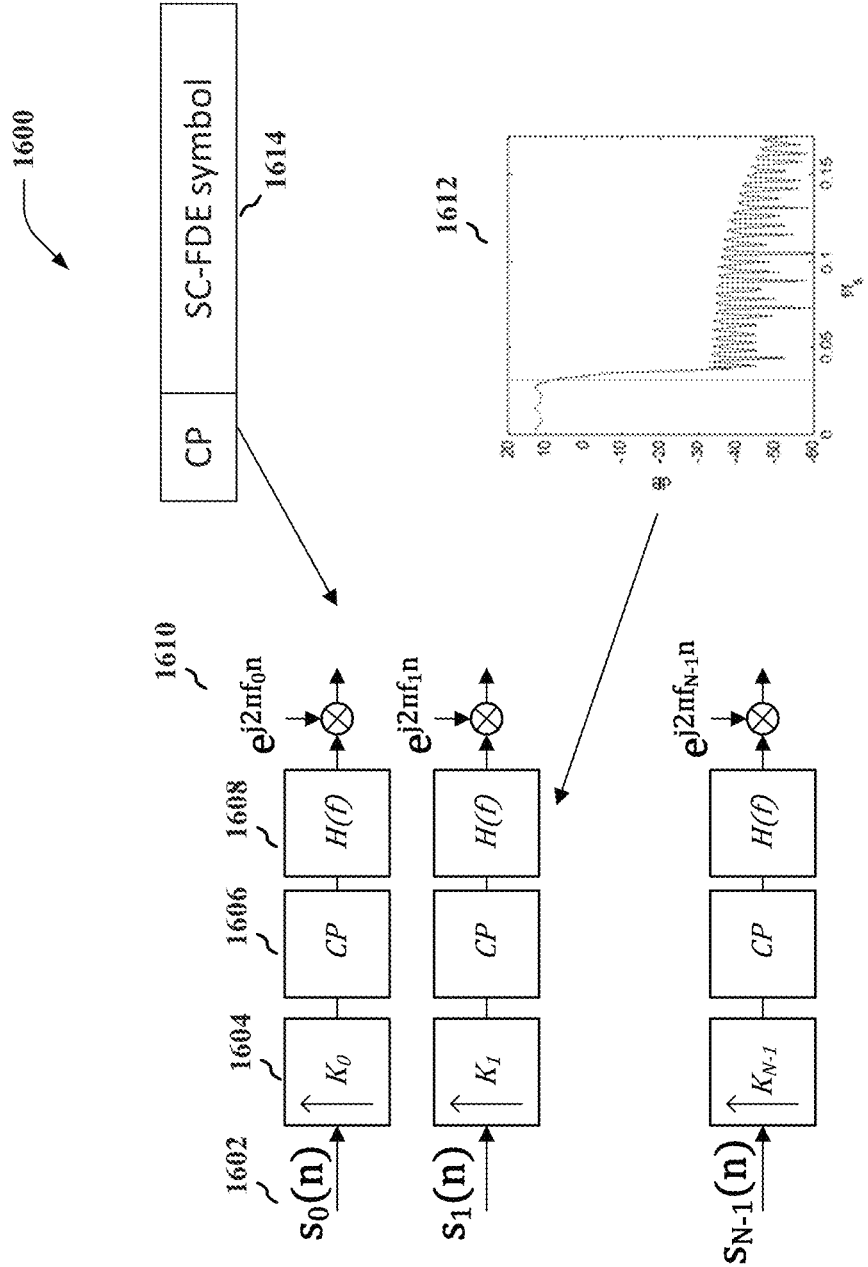
FIG. 16 is a diagram illustrating an example of transmitter circuitry for enabling asynchronous communication using multicarrier frequency domain equalization (FDE) in accordance with some aspects of the disclosure.

FIG. 16 is a diagram illustrating an example of transmitter circuitry 1600 for enabling asynchronous communication using multicarrier frequency domain equalization (FDE) in accordance with some aspects of the disclosure. The transmitter circuitry 1600 includes a number of user signal inputs (e.g., $s_0(n)$, $s_1(n)$ . . . $s_{N-1}(n)$) 1602 (e.g., user baseband signals to be transmitted). The first user signal (e.g., $s_0(n)$) is upsampled at block 1604 (e.g., at $K_0$), appended with a cyclic prefix (CP) at block 1606, filtered with a filter at block 1608 (e.g., at $H(f)$), and then modulated onto a subcarrier frequency at block 1610 (e.g., $f_0$). In an aspect, single carrier waveforms can be used for power efficiency. In an aspect, the user bandwidths may be scaled as needed (e.g., 300 kilo hertz (kHz) or 1 mega hertz (MHz) per carrier or wideband). Waveform sub-diagram 1612 shows the frequency response of the filter $H(f)$. In an aspect, the frequency response of waveform sub-diagram 1612 can correspond to a 1/16 bandwidth (BW) occupancy with beta equal to 0.2 at −40 dB with 10 symbols per span. Sub-frame 1614 illustrates the structure of a typical sub-frame including a single carrier FDE (SC-FDE) symbol. In an aspect, the transmitter circuitry 1600 provides for separate symbols per carrier with no requirement on synchronism. In an aspect, the transmitter circuitry 1600 provides frequency division multiplexing of separate user sub-bands to reduce adjacent channel interference (ACI).

Figure 17:
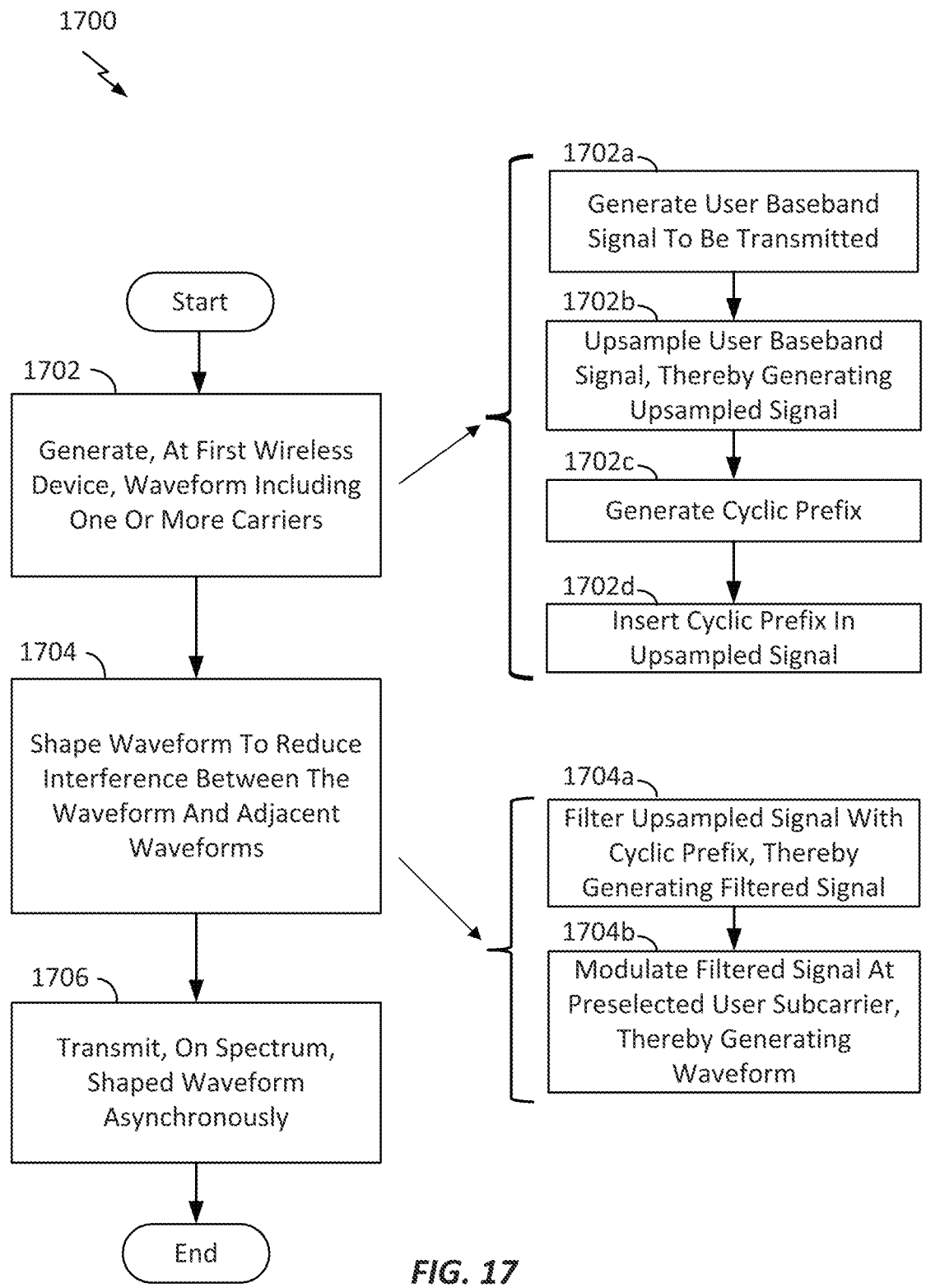
FIG. 17 is a diagram illustrating an exemplary process for operating transmitter circuitry enabled for asynchronous communication using multicarrier frequency domain equalization (FDE) in accordance with some aspects of the disclosure.

FIG. 17 is a diagram illustrating an exemplary process 1700 for operating transmitter circuitry enabled for asynchronous communication using multicarrier frequency domain equalization (FDE) in accordance with some aspects of the disclosure. In an aspect, the process 1700 can be performed by the transmitter circuitry of FIG. 16 or other suitable circuitry.

In block 1702, the process generates, at a first wireless device, a waveform including one or more carriers. In one aspect, this can be performed by block 904 in FIG. 9. In sub-block 1702a of block 1702, the process generates a user baseband signal to be transmitted. In one aspect, this can be performed by block 1602 in FIG. 16. In sub-block 1702b of block 1702, the process upsamples the user baseband signal, thereby generating a upsampled signal. In one aspect, this can be performed by block 1604 in FIG. 16. In sub-block 1702c of block 1702, the process generates a cyclic prefix. In sub-block 1702d of block 1702, the process inserts the cyclic prefix in the upsampled signal. In one aspect, this can be performed by block 1606 in FIG. 16.

In block 1704, the process shapes the waveform to reduce interference between the waveform and adjacent waveforms (e.g., to enable the first wireless device to transmit asynchronously or to improve the first wireless device's performance when transmitting asynchronously). In one aspect, this can be performed by block 906 in FIG. 9 and/or block 1608 in FIG. 16. In sub-block 1704a of block 1704, the process filters the upsampled signal with the cyclic prefix, thereby generating a filtered signal. In one aspect, this can be performed by block 906 in FIG. 9 and/or block 1608 in FIG. 16. In sub-block 1704b of block 1704, the process modulates the filtered signal at a preselected user subcarrier, thereby generating a waveform (e.g., shaped waveform). In one aspect, this can be performed by block 906 in FIG. 9 and/or block 1610 in FIG. 16.

In block 1706, the process transmits, on a spectrum, the shaped waveform asynchronously. In one aspect, this can be performed by block 908 in FIG. 9, and/or block 1600 in FIG. 16.

In one aspect, the process 1700 also handles collisions between users. For example, in one aspect, the process provides a preselected bandwidth for asynchronous communications on a wireless network, and then recovers signals from two preselected wireless devices communicating asynchronously, where the recovering can involve using code division multiple access across the two preselected wireless devices. In other cases, other collision handling techniques may be used.

Figure 18:
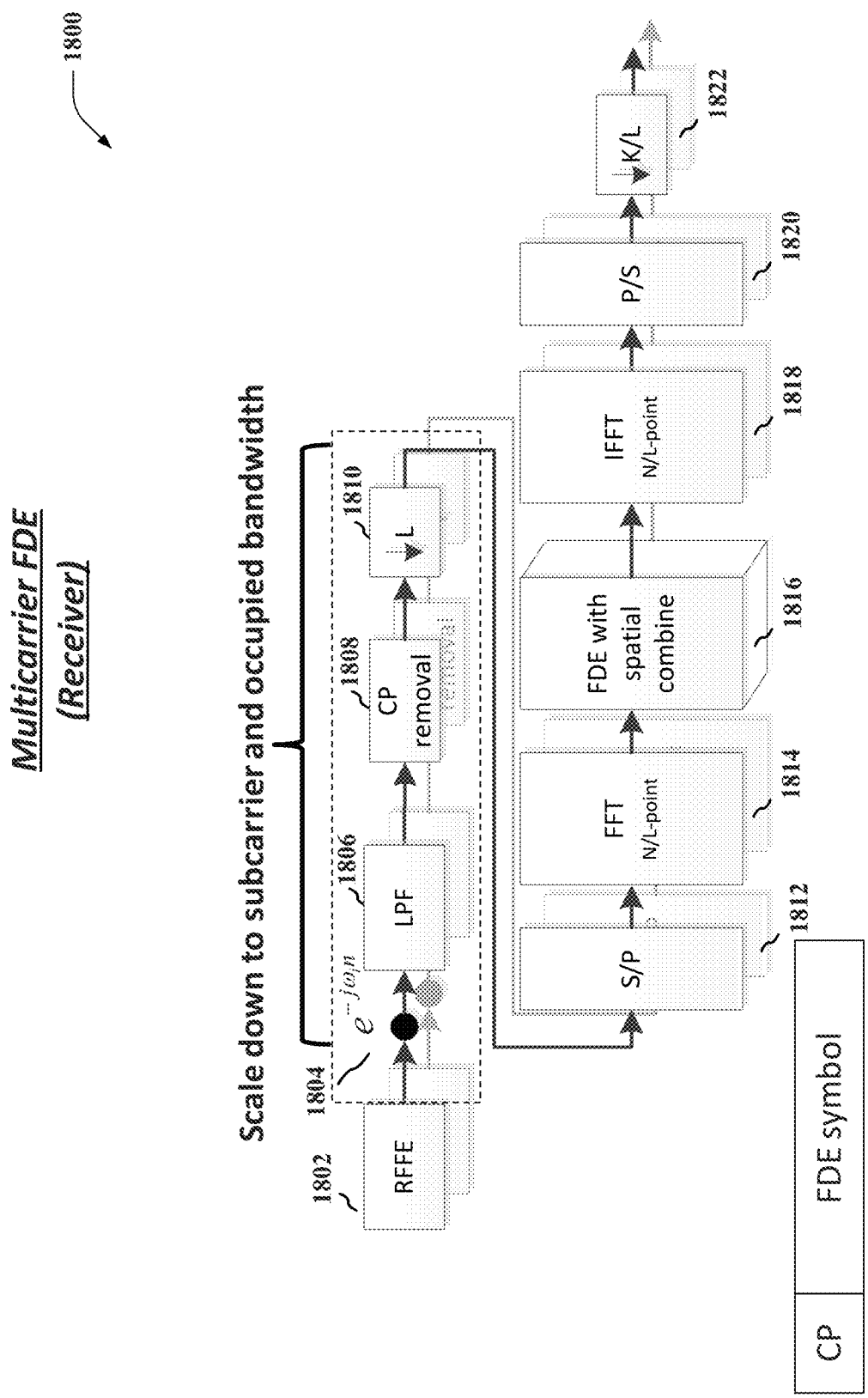
FIG. 18 is a diagram illustrating an example of receiver circuitry for enabling asynchronous communication using multicarrier frequency domain equalization (FDE) in accordance with some aspects of the disclosure.

FIG. 18 is a diagram illustrating an example of receiver circuitry 1800 for enabling asynchronous communication using multicarrier frequency domain equalization (FDE) in accordance with some aspects of the disclosure. The receiver circuitry 1800 receives an input signal (e.g., signal from user communicating asynchronously in a multicarrier communication system) at a radio frequency front end (RFFE) block 1802. The next four components (1804, 1806, 1808, 1810) collectively scale down the received signal to the subcarrier and occupied bandwidth. More specifically, block 1804 can demodulate the received signal. Block 1806 can apply low pass filtering (LPF). Block 1808 can remove the cyclic prefix (CP) and block 1810 can down sample the received signal. After the received signal has been scaled down, it is provided to a serial to parallel (S/P) block 1812. The output of the S/P is provided to a fast Fourier transform (FFT) 1814. Note that the baseband waveform at 1806 may be oversampled to a point such that an N-point FFT after CP removal in 1808 might be used to recover the information encoded along the data tones. However, since the waveform may actually have its energy concentrated in a narrower bandwidth captured by the filter in 1806, it follows that the baseband waveform might be further sub-sampled by some rate L such that the FFT complexity can be reduced to N/L points 1814 when recovering information encoded along the tones. The output of the FFT 1814 (e.g., processed signal derived from initial user input signal) is provided to a frequency domain equalization (FDE) block 1816 (e.g., with spatial combine capabilities).

As an aside, note that FDE is an effective technique that exhibits the property of relatively low complexity which grows linearly with increasing the number of tones in the FFT as compared with conventional time domain equalization. However, in practical broadband wireless communications, there exists not only multipath but also narrowband interference (NBI). The conventional FDE methods may not consider NBI and performance thus degrades. Using FDE with spatial combine capabilities may effectively suppress NBI to obtain maximum signal to noise ratio. FDE with spatial combine capabilities may employ a conventional algorithm such as least mean square or recursive least square.

The output of the FDE block 1816 is provided to an inverse fast Fourier transform (IFFT) 1818 commensurate with the size of the FFT 1814 used to transform the received samples into the frequency domain, which in FIG. 18 is N/L points. The output of the IFFT 1818 is then provided to a parallel to serial (P/S) block 1820. The output of the P/S block 1820 is then provided to a downsampling block (K/L) 1822 and then the equalized symbols can be de-modulated. In an aspect, the use of FDE with CP (as in the circuits of FIGS. 16 and 18) thereby mitigates inter-symbol interference and provides equalizer complexity scaling as OFDM.

Figure 19:
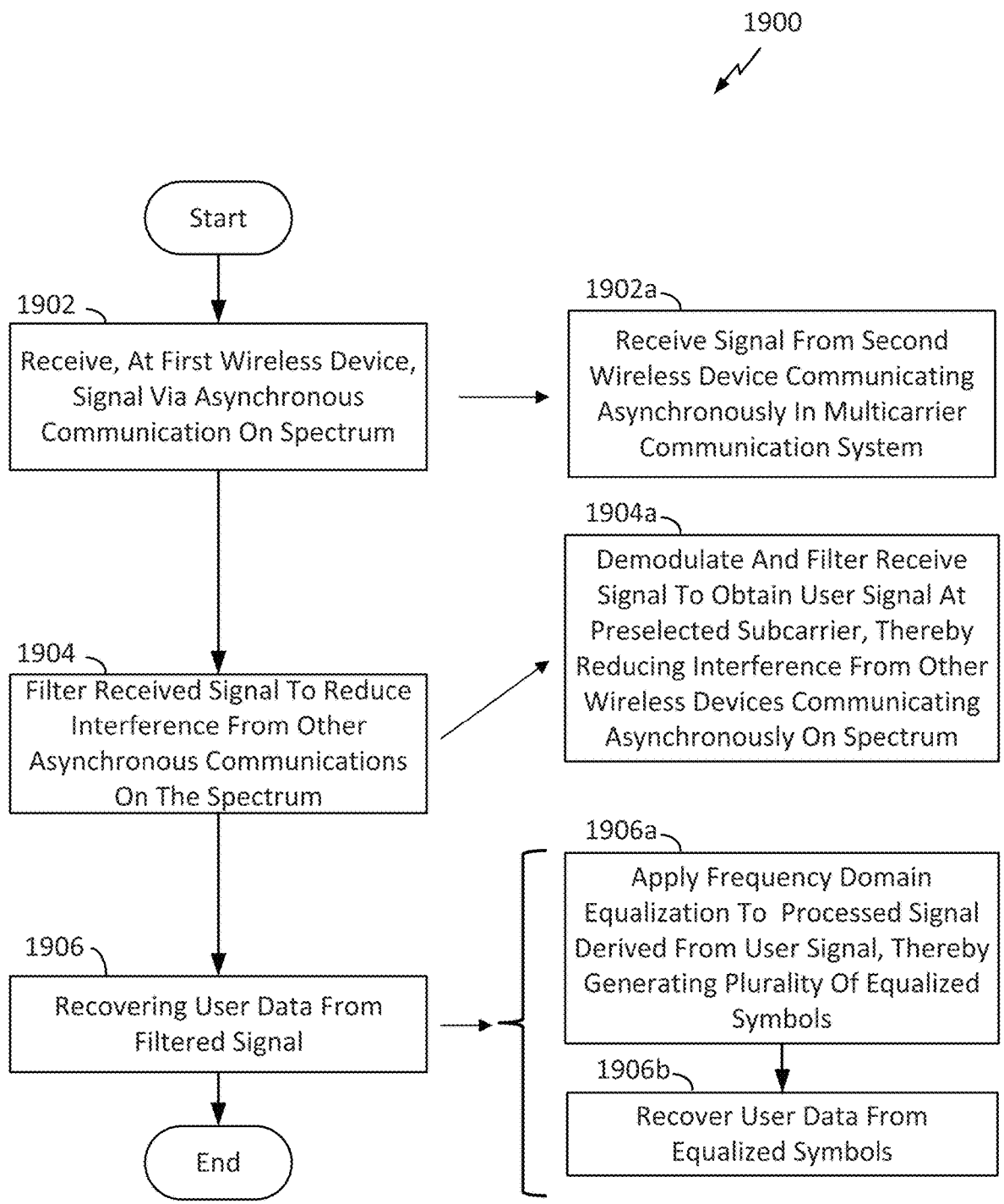
FIG. 19 is a diagram illustrating an exemplary process for operating receiver circuitry enabled for asynchronous communication using multicarrier frequency domain equalization (FDE) in accordance with some aspects of the disclosure.

FIG. 19 is a diagram illustrating an exemplary process 1900 for operating receiver circuitry enabled for asynchronous communication using multicarrier frequency domain equalization (FDE) in accordance with some aspects of the disclosure. In an aspect, the process 1900 can be performed by the receiver circuitry of FIG. 18 or other suitable circuitry.

In block 1902, the process receives, at a first wireless device, a signal via asynchronous communication on a spectrum. In sub-block 1902a of block 1902, the process receives a signal from a user communicating asynchronously in a multicarrier communication system. In one aspect, this can be performed by block 1104 in FIG. 11 and/or block 1802 in FIG. 18.

In block 1904, the process filters the received signal to reduce interference from other asynchronous communications on the spectrum. In sub-block 1904a of block 1904, the process demodulates and filters the receive signal to obtain a user signal at a preselected subcarrier, thereby reducing interference from other wireless devices communicating asynchronously on the spectrum. In one aspect, this can be performed by block 1106 in FIG. 11 and/or blocks 1804-1812 in FIG. 18.

In block 1906, the process recovers user data from the filtered signal. In one aspect, this can be performed by block 1108 in FIG. 11 and/or blocks 1814-1822 in FIG. 18. In sub-block 1906a of block 1906, the process applies frequency domain equalization to a processed signal derived from the user signal, thereby generating a plurality of equalized symbols. In one aspect, this can be performed by block 1816 in FIG. 18. In sub-block 1906b of block 1906, the process recovers user data from the equalized symbols. In one aspect, the process removes the cyclic prefix from the user signal before applying the frequency domain equalization. In one aspect, this can be performed by blocks 1818, 1820, and/or 1822 in FIG. 18.

In one aspect, the process 1900 also handles collisions between users. For example, in one aspect, the process provides a preselected bandwidth for asynchronous communications on a wireless network, and then recovers signals from two preselected wireless devices communicating asynchronously, where the recovering can involve using code division multiple access across the two preselected wireless devices. In other cases, other collision handling techniques may be used.

In addition to waveform design or shaping as described above for FIGS. 7-19, there may be a need to engage in network planning and signaling (e.g., allocating bandwidth) to support asynchronous communications. Accordingly, FIGS. 20-25 relate to network planning and signaling.

Figure 20:
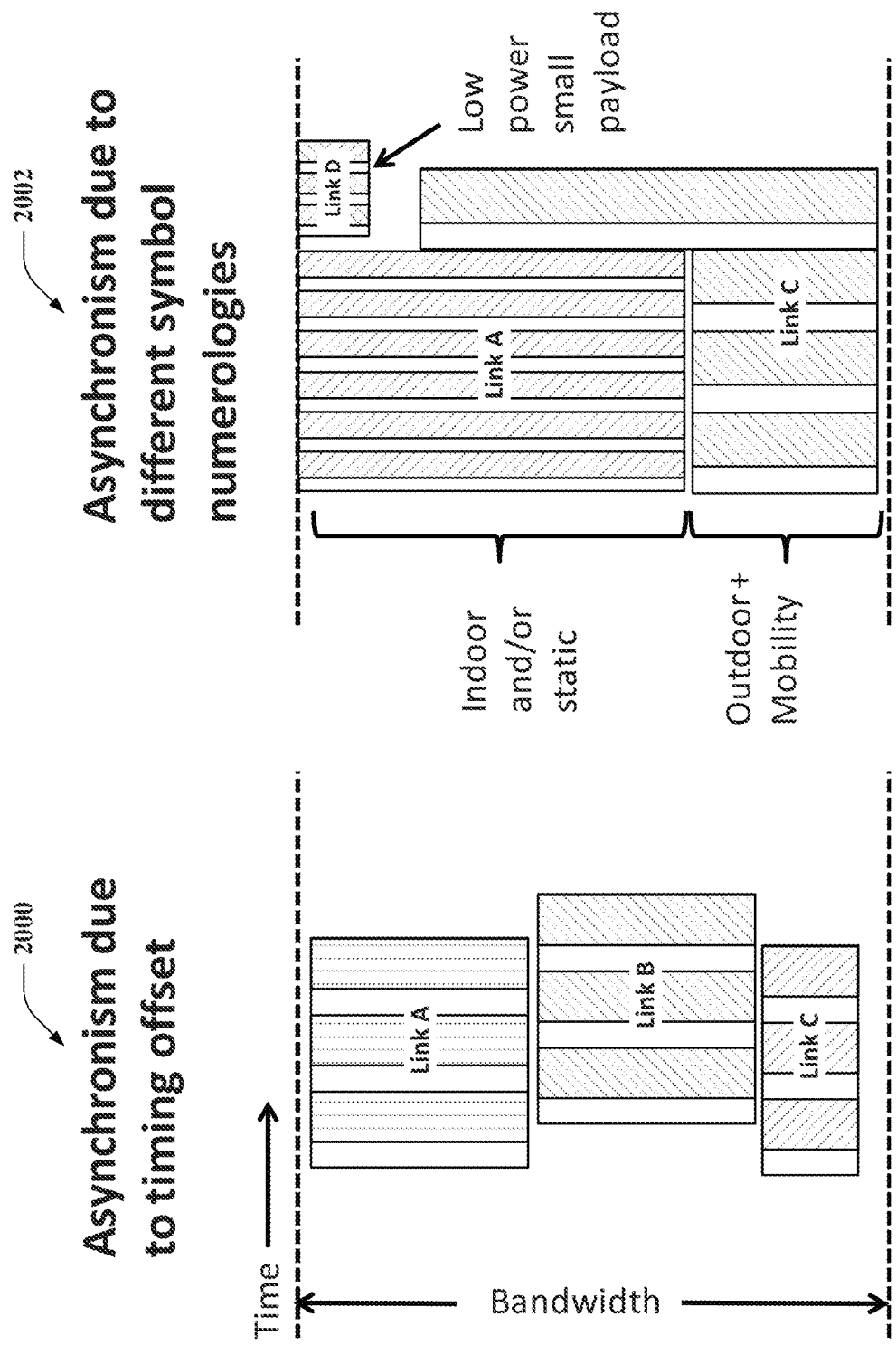
FIG. 20 is a diagram illustrating two examples for allocating bandwidth for asynchronous communications in a wireless communication network in accordance with some aspects of the disclosure.

FIG. 20 is a diagram illustrating two examples for allocating bandwidth for asynchronous communications in a wireless communication network in accordance with some aspects of the disclosure. The first example 2000 illustrates a provisioning of bandwidth for a Link A, Link B, and Link C for asynchronous communication based on differences in timing (e.g., timing offset). For each link (e.g., Link A, Link B, Link C) in FIG. 20, the link is depicted as a sequence of un-shaded rectangles followed shaded rectangles where the un-shaded rectangles represent a CP length and the shaded rectangles represent a symbol length. The second example 2002 illustrates a provisioning of bandwidth for a Link A, Link B, and Link C for asynchronous communication based on different symbol numerologies for the three links. In OFDM systems, if the symbol length of Link A differs from those in Link B (as shown in the second example 2002), then the circularity of the sinusoids in each symbol will not have the same properties, i.e., the symbol lengths will be different and cyclic prefixes will not align and thus can be asynchronous. This lack of alignment can lead to inter-carrier interference. For example, the different symbol numerologies are placed into categories for wireless devices, including those involved in indoor and/or static communications, outdoor mobility communications, and low power small payload communications. In other aspects, other symbol numerologies and categories can be used. Thus, in one aspect, the term "asynchronous" can be defined as communication where users start at different times using the same symbol size (e.g., as in the first example 2000), and/or communication where users start at the same time using the different symbol sizes (e.g., as in the second example 2002).

Figure 21:
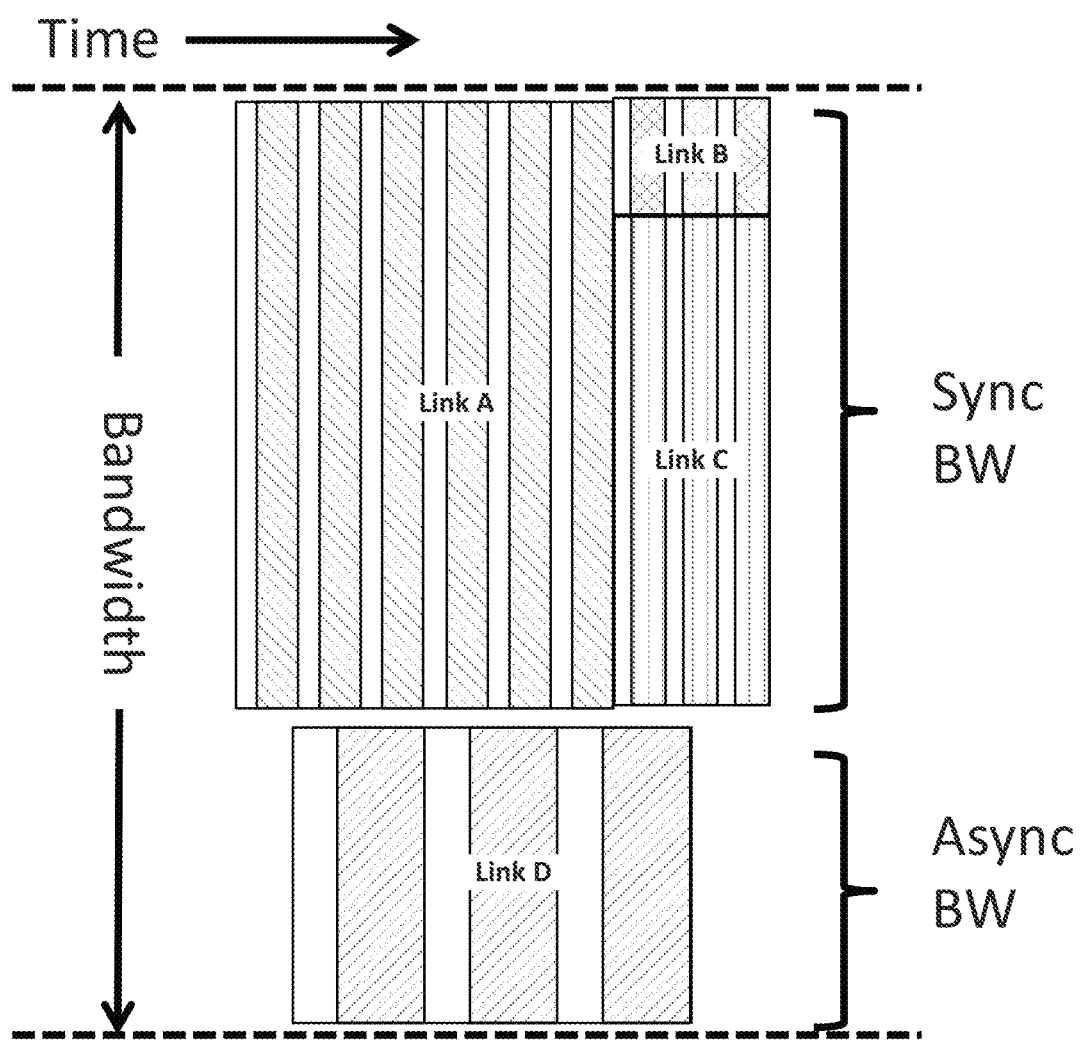
FIG. 21 is a diagram illustrating an example for allocating bandwidth for synchronous and asynchronous communications using static or semi-static provisioning in a wireless communication network in accordance with some aspects of the disclosure.

FIG. 21 is a diagram illustrating an example for allocating bandwidth for synchronous and asynchronous communications using static or semi-static provisioning in a wireless communication network in accordance with some aspects of the disclosure. Link A, Link B, Link C are links involved in synchronous communications, while Link D is involved in asynchronous communications. For each link (e.g., Link A, Link B, Link C) in FIG. 21, the link is depicted as a sequence of un-shaded rectangles followed shaded rectangles where the un-shaded rectangles represent a CP length and the shaded rectangles represent a symbol length. In an aspect, the network may set aside bandwidth for both synchronous and asynchronous communications. For example, in an aspect, the network can assign bandwidth for asynchronous communications for low power and low startup latency type devices, while providing other bandwidth for synchronous communications for nominal connections with higher spectral efficiency. In one such case, transmission without grant may be allowed for small payload links. In an aspect the network bandwidth provisioning may be based on peak traffic demand expectations or other such network characteristics. For example, in an aspect, the provisions may change slowly based on historical demand and/or loading patterns.

Figure 22:
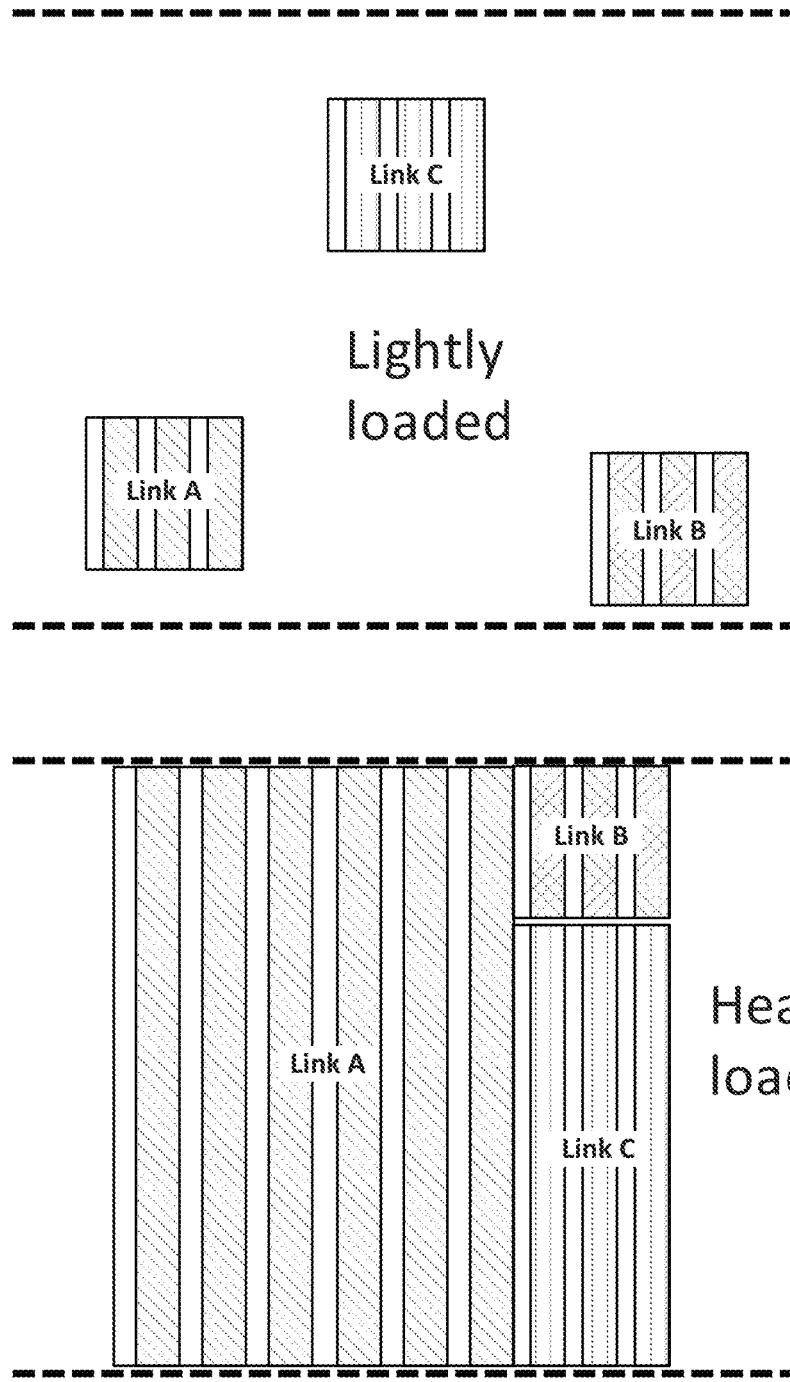
FIG. 22 is a diagram illustrating an example for allocating bandwidth for synchronous and asynchronous communications using dynamic provisioning in a wireless communication network in accordance with some aspects of the disclosure.

FIG. 22 is a diagram illustrating an example for allocating bandwidth for synchronous and asynchronous communications using dynamic provisioning in a wireless communication network in accordance with some aspects of the disclosure. In an aspect, the network may dynamically provision bandwidth for Link A, Link B, and Link C for asynchronous communication based on loading. In one such case for lightly loaded/unloaded case, the network may send control signaling to indicate that synchronization requirements can be relaxed (e.g., enabling asynchronous communications for Link A, Link B, and Link C). In an aspect, users may switch from asynchronous to synchronous waveforms, or be signaled by the network on certain parameters to use. In an aspect for a heavily loaded case, the network may propagate the signal to enforce synchronization (e.g., enforcing synchronous communications for Link A, Link B, and Link C). The diagram of FIG. 22 shows the bandwidth allocation for both the lightly loaded and heavily loaded cases. For each link (e.g., Link A, Link B, Link C) in FIG. 22, the link is depicted as a sequence of un-shaded rectangles followed shaded rectangles where the un-shaded rectangles represent a CP length and the shaded rectangles represent a symbol length.

Figure 23:
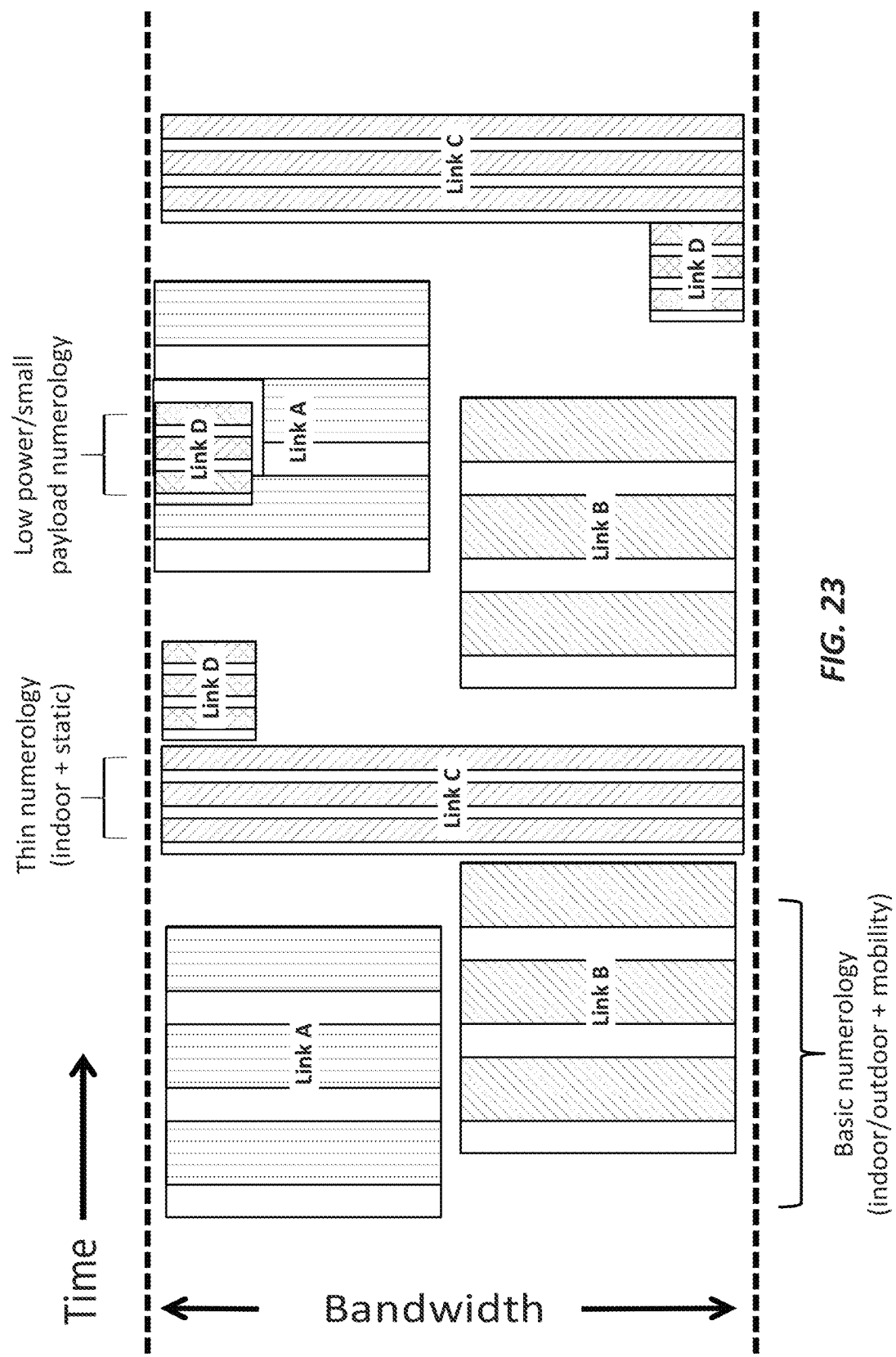
FIG. 23 is a diagram illustrating examples for allocating bandwidth for asynchronous communications with symbol numerology optimized for various use cases in a wireless communication network in accordance with some aspects of the disclosure.

FIG. 23 is a diagram illustrating examples for allocating bandwidth for asynchronous communications with symbol numerology optimized for various use cases in a wireless communication network in accordance with some aspects of the disclosure. Link A and Link B are using basic symbol numerology which may be appropriate for indoor/outdoor activities while mobile. Link C is using thin symbol numerology which may be appropriate for indoor activity while static. Link D is using a low power or small payload symbol numerology which may be similar to the thin numerology. For each link (e.g., Link A, Link B, Link C, Link D) in FIG. 23, the link is depicted as a sequence of un-shaded rectangles followed shaded rectangles where the un-shaded rectangles represent a CP length and the shaded rectangles represent a symbol length. In an aspect, FIG. 23 illustrates that design options may permit multiplexing of symbol numerology optimized for various use cases.

Figure 24:
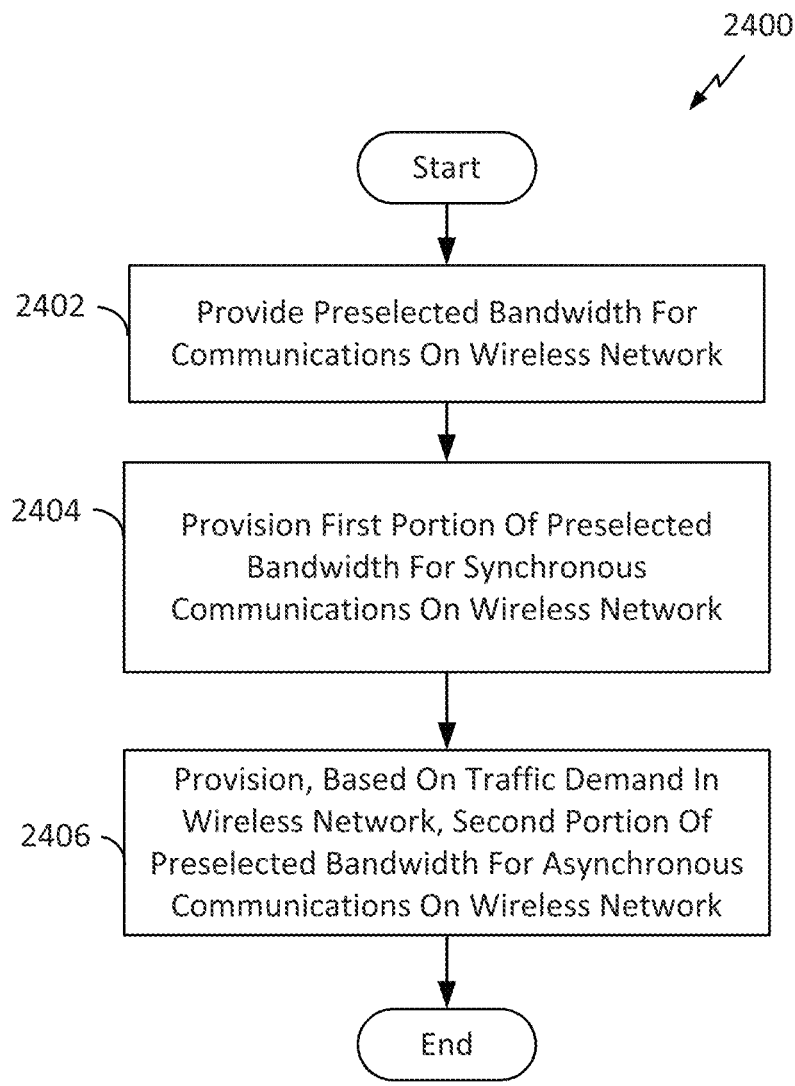
FIG. 24 is a diagram illustrating an exemplary process for allocating bandwidth for asynchronous communications in a wireless communication network in accordance with some aspects of the disclosure.

FIG. 24 is a diagram illustrating an exemplary process 2400 for allocating bandwidth for asynchronous communications in a wireless communication network in accordance with some aspects of the disclosure. In an aspect, the process 2400 can be performed in accordance with one or more of the examples presented in FIGS. 20, 21, and 22. In one aspect, process 2400 can be performed using the wireless device 100 of FIG. 1 (e.g., as a base station or the equivalent in a wireless network). In block 2402, the process provides a preselected bandwidth for communications on a wireless network. In block 2404, the process provisions a first portion of the preselected bandwidth for synchronous communications on the wireless network. In block 2406, the process provisions, based on a traffic demand in the wireless network, a second portion of the preselected bandwidth for asynchronous communications on the wireless network. In an aspect, the traffic demand includes a predicted traffic demand (e.g., static demand) and/or a real-time traffic demand (e.g., dynamic demand).

In one aspect, the process 2400 also handles collisions between users. For example, in one aspect, the process recovers signals from two preselected wireless devices communicating asynchronously, where the recovering can involve using code division multiple access across the two preselected wireless devices. In other cases, other collision handling techniques may be used.

Figure 25:
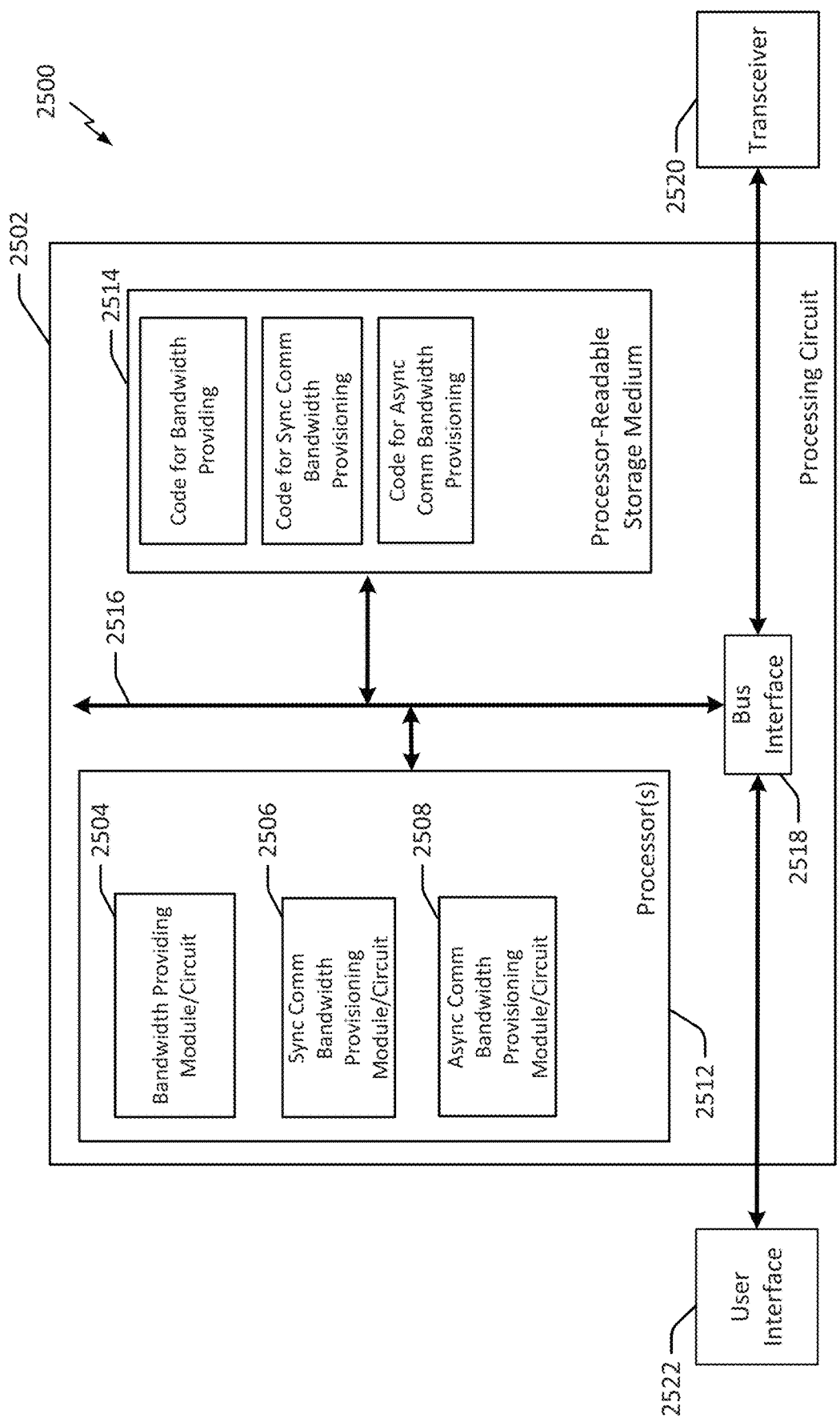
FIG. 25 is a diagram illustrating a simplified example of a hardware implementation for an apparatus employing a processing circuit and adapted for allocating bandwidth for asynchronous communications in a wireless communication network in accordance with some aspects of the disclosure.

FIG. 25 is a diagram 2500 illustrating a simplified example of a hardware implementation for an apparatus employing a processing circuit 2502 and adapted for allocating bandwidth for asynchronous communications in a wireless communication network in accordance with some aspects of the disclosure. The processing circuit 2502 may be provided in accordance with certain aspects illustrated in relation to the processing system 114 of FIG. 1. The processing circuit 2502 has one or more processors 2512 that may include a microprocessor, microcontroller, digital signal processor, a sequencer and/or a state machine. The processing circuit 2502 may be implemented with a bus architecture, represented generally by the bus 2516. The bus 2516 may include any number of interconnecting buses and bridges depending on the specific application of the processing circuit 2502 and the overall design constraints. The bus 2516 links together various circuits including a computer-readable storage medium 2514 and the one or more processors 2512 and/or hardware devices that cooperate to perform certain functions described herein, and which are represented by the modules and/or circuits 2504, 2506, and 2508. The bus 2516 may also link various other circuits such as timing sources, timers, peripherals, voltage regulators, and power management circuits. A bus interface 2518 may provide an interface between the bus 2516 and other devices such as a transceiver 2520 or a user interface 2522. The transceiver 2520 may provide a wireless communications link for communicating with various other apparatus. In some instances the transceiver 2520 and/or user interface 2522 may connect directly to the bus 2516.

The processor 2512 is responsible for general processing, including the execution of software stored as code on the computer-readable storage medium 2514. The software, when executed by the processor 2512, configures one or more components of the processing circuit 2502 such that the processing circuit 2502 may perform the various functions described above for any particular apparatus. The computer-readable storage medium 2514 may also be used for storing data that is manipulated by the processor 2512 when executing software. The processing circuit 2502 further includes at least one of the modules 2504, 2506, and 2508. The modules 2504, 2506, and 2508 may be software modules running in the processor 2512 loaded from code resident and/or stored in the computer readable storage medium 2514, one or more hardware modules coupled to the processor 2512, or some combination thereof. The modules 2504, 2506, and/or 2508 may include microcontroller instructions, state machine configuration parameters, or some combination thereof.

Module and/or circuit 2504 may be configured to provide a preselected bandwidth for communications on a wireless network. In one aspect, the module and/or circuit 2504 may be configured to perform the functions described in relation to block 2402 in FIG. 24.

Module and/or circuit 2506 may be configured to provision a first portion of the preselected bandwidth for synchronous communications on the wireless network. In one aspect, the module and/or circuit 2506 may be configured to perform the functions described in relation to block 2404 in FIG. 24.

Module and/or circuit 2508 may be configured to provisions, based on a traffic demand in the wireless network, a second portion of the preselected bandwidth for asynchronous communications on the wireless network. In one aspect, the module and/or circuit 2508 may be configured to perform the functions described in relation to block 2406 in FIG. 24.

Some general aspects of WOLA filtering are described above for FIGS. 12-15. More specific aspects of WOLA filtering are described below for FIGS. 26-27 (e.g., for a transmitter and then for a receiver).

Figure 26:
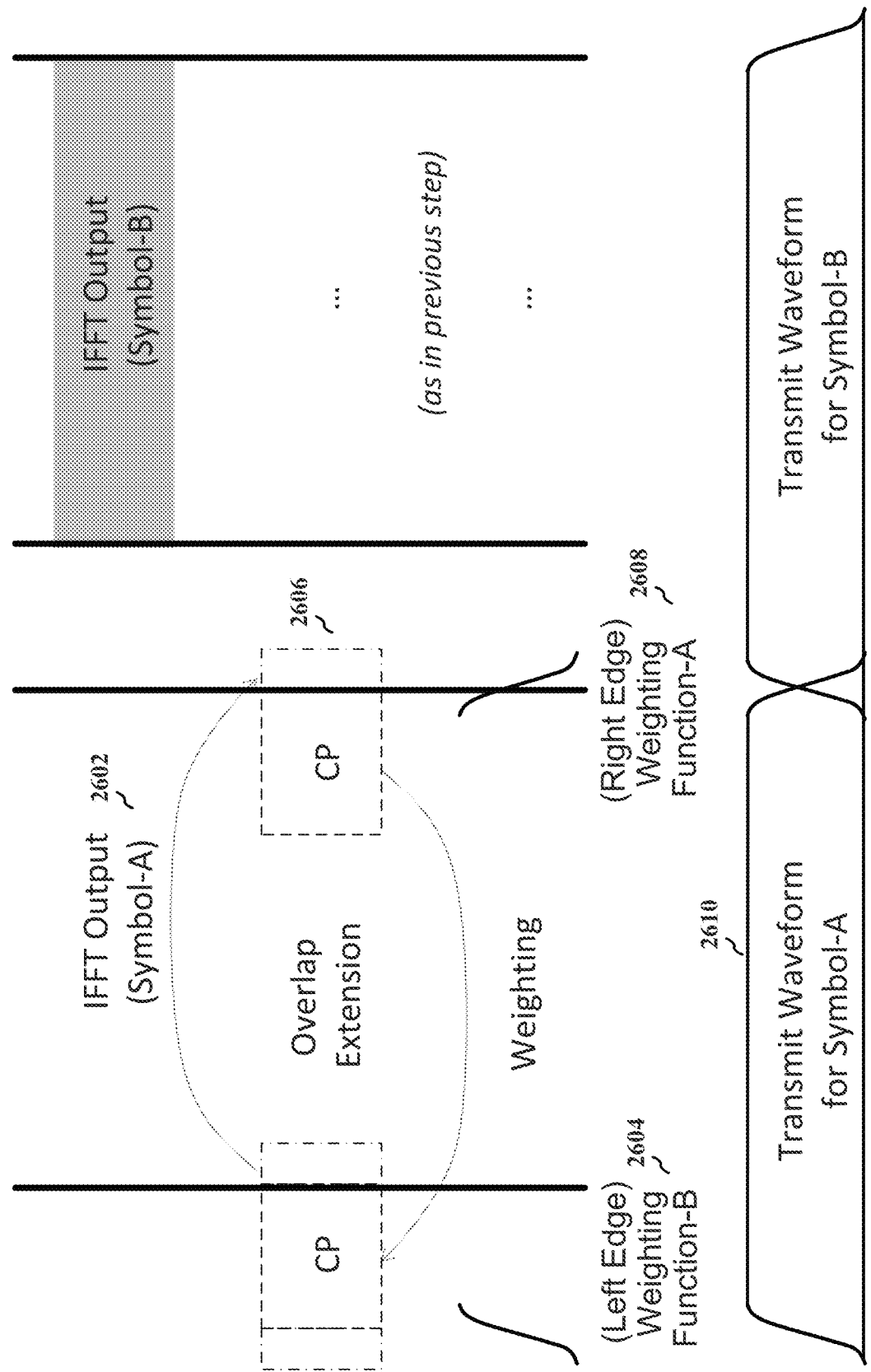
FIG. 26 is a schematic diagram illustrating a transmit windowing operation of a weighted overlap and add (WOLA) filter in accordance with some aspects of the disclosure.

FIG. 26 is a schematic diagram illustrating a transmit windowing operation of a weighted overlap and add (WOLA) filter in accordance with some aspects of the disclosure. In operation, input symbol-A 2602 is received from the output of an upstream IFFT block (see e.g., IFFT 1004 in FIG. 10). A preselected portion of the end (e.g., right edge) of the symbol-A 2602 is copied, weighted with left edge weighting function-B 2604, and appended to the beginning of the symbol-A 2602 as the cyclic prefix (CP) 2606. Right edge weighting function-A 2608 can also be applied to the end of symbol-A 2602. The resulting transmit waveform 2610 for symbol-A is shown at the bottom of FIG. 26. In effect, the WOLA filter can be used to control the length and degree of edge rolloff of the transmit waveform derived from the IFFT input symbol.

Figure 27:
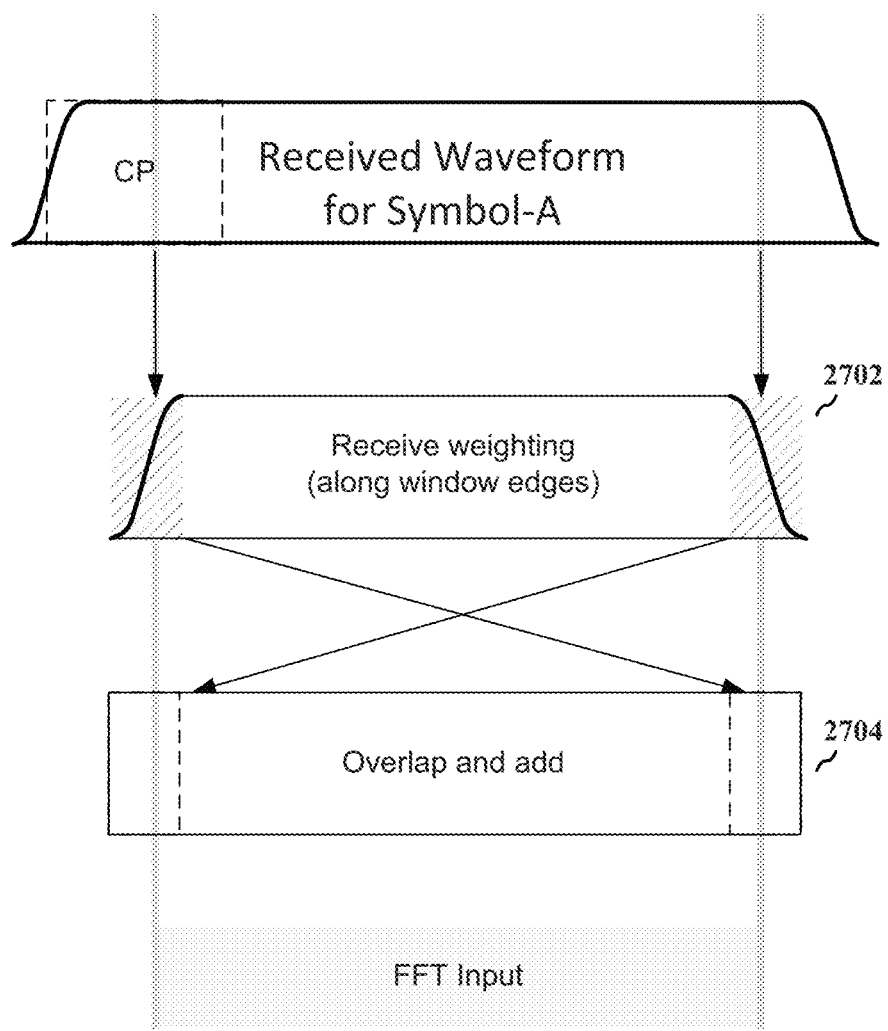
FIG. 27 is a schematic diagram illustrating a receive windowing operation of a weighted overlap and add (WOLA) filter in accordance with some aspects of the disclosure.

FIG. 27 is a schematic diagram illustrating a receive windowing operation of a weighted overlap and add (WOLA) filter in accordance with some aspects of the disclosure. In operation, the transmitted waveform (e.g., from WOLA filter operation of FIG. 26) has been captured and stored in a receive sample buffer for processing. The transmitted waveform may or may not have WOLA filtering along its edges, as discussed previously. The received waveform can be shortened to the FFT input length by first applying a weighted average window 2702 which may have a larger size than the FFT input length to accommodate a more gradual rolloff. Then, the edges of the weighted average output step can be overlapped and added through block 2704. The right side of the weighted average output is added to the left side of the waveform, and vice versa for the other side, in order to preserve circularity. Finally, a segment within this output of a length equal to that of the FFT input is selected for further processing. Analogous to the transmitter side, the receive WOLA filter can be used to control the length and degree of edge rolloff of the receive waveform for later processing at the FFT input.

The window length/placement in FIGS. 26-27 can be determined based on a number of factors, including, for example, power imbalance between signal and interference, frequency separation between signal and interference, and residual interference (without interfering signal). In addition, the emission floor of the dominant interferer(s) can also be considered for window placement.

Aspects of the present disclosure provide waveform design to reduce inter-carrier interference between links. At least two system implementations have been described, including transmitter waveform design for asynchronous communications (e.g., FIGS. 8, 9, 12, 13, 16, 17) and receiver waveform design for asynchronous communications (e.g., FIGS. 10, 11, 14, 15, 18, 19).

Aspects of the present disclosure also provide for network design across asynchronous modes. More specifically, the networks can include multiple links with different symbol numerologies, multiple links with different timing offsets, and/or both symbol and timing differences.

Aspects of the present disclosure also provide for network planning and signaling for asynchronous communication. More specifically, the networks can provision between asynchronous and synchronous communication using static and/or dynamic partitioning. In an aspect, the partitioning can be based on loading and traffic demand. In an aspect, the network can include provisioning for handling collisions such as using CDMA and successive interference cancellation. In an aspect, the network can conform to requirements on the acknowledgement (ACK) of asynchronous transmissions.

Aspects of the present disclosure include methods to allow the coexistence of asynchronous and synchronous subcarriers within a given system bandwidth, and provide mechanisms for provisioning the bandwidth accordingly.

As those skilled in the art will readily appreciate, various aspects described throughout this disclosure may be extended to any suitable telecommunication systems, network architectures and communication standards. By way of example, various aspects may be applied to UMTS systems such as W-CDMA, TD-SCDMA, and TD-CDMA. Various aspects may also be applied to systems employing Long Term Evolution (LTE) (in FDD, TDD, or both modes), LTE-Advanced (LTE-A) (in FDD, TDD, or both modes), 5G, CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems, including those described by yet-to-be defined wide area network standards. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-27 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-27 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, where reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Accordingly, the various features associate with the examples described herein and shown in the accompanying drawings can be implemented in different examples and implementations without departing from the scope of the disclosure. Therefore, although certain specific constructions and arrangements have been described and shown in the accompanying drawings, such implementations are merely illustrative and not restrictive of the scope of the disclosure, since various other additions and modifications to, and deletions from, the described implementations will be apparent to one of ordinary skill in the art. Thus, the scope of the disclosure is determined by the literal language, and legal equivalents, of the claims which follow.

What is claimed is:

1. A method of wireless communication, comprising:
   receiving, at a first wireless device, a signal via asynchronous communications from a second wireless device in an orthogonal frequency division multiple access (OFDMA) communication system, wherein the signal comprises an orthogonal waveform comprising one or more carriers;
   filtering the received signal to reduce interference from other asynchronous communications in the OFDMA communication system; and
   recovering user data from the filtered signal, wherein the recovering comprises:
      applying an OFDMA demodulation to the received signal to generate a plurality of frequency domain outputs, and
      applying frequency domain equalization to the frequency domain outputs to recover a plurality of user tones from the second wireless device.

2. The method of claim 1, wherein the filtering the received signal to reduce interference from other asynchronous communications in the OFDMA system comprises filtering the received signal using a weighted overlap and add filter.

3. The method of claim 2, wherein the filtering the received signal to reduce interference from other asynchronous communications in the OFDMA system comprises copying and weighting an end portion of an input symbol in the received signal and appending the end portion of the input symbol to a beginning of the input symbol.

4. The method of claim 2, wherein the filtering the received signal to reduce interference from other asynchronous communications in the OFDMA system comprises copying and weighting a beginning portion of an input symbol in the received signal and appending the beginning portion of the input symbol to an end of the input symbol.

5. A method of wireless communication, comprising:
   receiving, at a first wireless device, a signal via asynchronous communications on a spectrum, wherein the signal comprises an orthogonal waveform comprising one or more carriers, and wherein the receiving comprises:

receiving the signal from a second wireless device communicating asynchronously on the spectrum;

filtering the received signal to reduce interference from other asynchronous communications on the spectrum, wherein the filtering comprises:

demodulating and filtering the received signal to obtain a user signal at a preselected subcarrier, thereby reducing interference from other wireless devices communicating asynchronously on the spectrum; and recovering user data from the filtered signal, wherein the recovering comprises:

applying frequency domain equalization to a processed signal derived from the user signal, thereby generating a plurality of equalized symbols, and recovering the user data from the equalized symbols.

6. The method of claim 5, further comprising:

removing a cyclic prefix from the user signal before applying the frequency domain equalization.

7. A wireless communication device, comprising:

means for receiving, at a first wireless device, a signal via asynchronous communications from a second wireless device in an orthogonal frequency division multiple access (OFDMA) communication system, wherein the signal comprises an orthogonal waveform comprising one or more carriers;

means for filtering the received signal to reduce interference from other asynchronous communications in the OFDMA communication system; and means for recovering user data from the filtered signal, wherein the means for recovering comprises:

means for applying an OFDMA demodulation to the received signal to generate a plurality of frequency domain outputs, and means for applying frequency domain equalization to the frequency domain outputs to recover a plurality of user tones from the second wireless device.

8. The wireless communication device of claim 7, wherein the means for filtering the received signal to reduce interference from other asynchronous communications in the OFDMA system comprises means for filtering the received signal using a weighted overlap and add filter.

9. The wireless communication device of claim 8, wherein the means for filtering the received signal to reduce interference from other asynchronous communications in the OFDMA system comprises means for copying and weighting an end portion of an input symbol in the received signal and appending the end portion of the input symbol to a beginning of the input symbol.

10. The wireless communication device of claim 8, wherein the means for filtering the received signal to reduce interference from other asynchronous communications in the OFDMA system comprises means for copying and weighting a beginning portion of an input symbol in the received signal and appending the beginning portion of the input symbol to an end of the input symbol.

11. A wireless communication device, comprising:

means for receiving, at a first wireless device, a signal via asynchronous communications on a spectrum, wherein the signal comprises an orthogonal waveform comprising one or more carriers, and wherein the means for receiving comprises:

means for receiving the signal from a second wireless device communicating asynchronously on the spectrum;

means for filtering the received signal to reduce interference from other asynchronous communications on the spectrum, wherein the means for filtering comprises:

means for demodulating and filtering the received signal to obtain a user signal at a preselected subcarrier, thereby reducing interference from other wireless devices communicating asynchronously on the spectrum; and means for recovering user data from the filtered signal, wherein the means for recovering comprises:

means for applying frequency domain equalization to a processed signal derived from the user signal, thereby generating a plurality of equalized symbols, and means for recovering the user data from the equalized symbols.

12. The wireless communication device of claim 11, further comprising:

means for removing a cyclic prefix from the user signal before applying the frequency domain equalization.

13. A wireless communication device, comprising:

at least one processor;

a memory communicatively coupled to the at least one processor; and a communication interface communicatively coupled to the at least one processor, wherein the at least one processor is configured to:

receive, at a first wireless device, a signal via asynchronous communications from a second wireless device in an orthogonal frequency division multiple access (OFDMA) communication system, wherein the signal comprises an orthogonal waveform comprising one or more carriers;

filter the received signal to reduce interference from other asynchronous communications in the OFDMA communication system; and recover user data from the filtered signal, wherein the at least one processor is further configured to:

apply an OFDMA demodulation to the received signal to generate a plurality of frequency domain outputs, and apply frequency domain equalization to the frequency domain outputs to recover a plurality of user tones from the second wireless device.

14. The wireless communication device of claim 13, wherein the at least one processor is further configured to:

filter the received signal using a weighted overlap and add filter.

15. The wireless communication device of claim 14, wherein the at least one processor is further configured to:

copy and weight an end portion of an input symbol in the received signal and append the end portion of the input symbol to a beginning of the input symbol.

16. The wireless communication device of claim 14, wherein the at least one processor is further configured to:

copy and weight a beginning portion of an input symbol in the received signal and append the beginning portion of the input symbol to an end of the input symbol.

17. A wireless communication device, comprising:

at least one processor;

a memory communicatively coupled to the at least one processor; and a communication interface communicatively coupled to the at least one processor, wherein the at least one processor is configured to:

receive, at a first wireless device, a signal via asynchronous communications on a spectrum, wherein the signal comprises an orthogonal waveform comprising one or more carriers, wherein the at least one processor is further configured to receive the signal from a second wireless device communicating asynchronously on the spectrum, filter the received signal to reduce interference from other asynchronous communications on the spectrum, wherein the at least one processor is further configured to demodulate and filter the received signal to obtain a user signal at a preselected subcarrier, thereby reducing interference from other wireless devices communicating asynchronously on the spectrum, and recover user data from the filtered signal, wherein the at least one processor is further configured to:

apply frequency domain equalization to a processed signal derived from the user signal, thereby generating a plurality of equalized symbols, and recover the user data from the equalized symbols.

18. The wireless communication device of claim 17, wherein the at least one processor is further configured to:
remove a cyclic prefix from the user signal before applying the frequency domain equalization.

19. A non-transitory computer readable medium storing computer executable code, comprising code for:

receiving, at a first wireless device, a signal via asynchronous communications from a second wireless device in an orthogonal frequency division multiple access (OFDMA) communication system, wherein the signal comprises an orthogonal waveform comprising one or more carriers;

filtering the received signal to reduce interference from other asynchronous communications in the OFDMA communication system; and recovering user data from the filtered signal, wherein the recovering the user data comprises:

applying an OFDMA demodulation to the received signal to generate a plurality of frequency domain outputs, and applying frequency domain equalization to the frequency domain outputs to recover a plurality of user tones from the second wireless device.

20. The non-transitory computer readable medium of claim 19, comprising further code for:

filtering the received signal using a weighted overlap and add filter.

21. The non-transitory computer readable medium of claim 20, comprising further code for:

copying and weighting an end portion of an input symbol in the received signal and appending the end portion of the input symbol to a beginning of the input symbol.

22. The non-transitory computer readable medium of claim 20, comprising further code for:

copying and weighting a beginning portion of an input symbol in the received signal and appending the beginning portion of the input symbol to an end of the input symbol.

23. A non-transitory computer readable medium storing computer executable code, comprising code for:

receiving, at a first wireless device, a signal via asynchronous communications on a spectrum, wherein the signal comprises an orthogonal waveform comprising one or more carriers, the non-transitory computer readable medium comprising further code for receiving the signal from a second wireless device communicating asynchronously on the spectrum;

filtering the received signal to reduce interference from other asynchronous communications on the spectrum, the non-transitory computer readable medium comprising further code for demodulating and filtering the received signal to obtain a user signal at a preselected subcarrier, thereby reducing interference from other wireless devices communicating asynchronously on the spectrum; and recovering user data from the filtered signal, the non-transitory computer readable medium comprising further code for:

applying frequency domain equalization to a processed signal derived from the user signal, thereby generating a plurality of equalized symbols, and recovering the user data from the equalized symbols.

24. The non-transitory computer readable medium of claim 23, comprising further code for:

removing a cyclic prefix from the user signal before applying the frequency domain equalization.

* * * * *